United States Patent [19]
Schipper et al.

[11] Patent Number: 5,577,122
[45] Date of Patent: Nov. 19, 1996

[54] SECURE COMMUNICATION OF INFORMATION

[75] Inventors: John F. Schipper, Palo Alto; Walter C. Melton, Los Gatos, both of Calif.

[73] Assignee: Trimble Navigation Limited, Sunnyvale, Calif.

[21] Appl. No.: 367,440

[22] Filed: Dec. 29, 1994

[51] Int. Cl.$^6$ .............................. H04K 1/00; H09B 7/185; G01C 21/00

[52] U.S. Cl. ........................... 380/28; 342/357; 342/358; 364/449; 364/459; 364/452

[58] Field of Search ..................................... 342/357, 358; 364/449, 459, 452; 380/28, 30, 29

[56] References Cited

U.S. PATENT DOCUMENTS

| | | | |
|---|---|---|---|
| 5,323,322 | 6/1994 | Mueller et al. | 364/449 |
| 5,451,964 | 9/1995 | Babu | 342/357 |
| 5,495,257 | 2/1996 | Loomis | 342/357 |

*Primary Examiner*—Stephen C. Buczinski
*Attorney, Agent, or Firm*—John Schipper

[57] ABSTRACT

Methods for secure communication of location and other information by two spaced apart receivers in a location determination (LD) system, such as GPS, GLONASS and LORAN-C, that use pseudorange corrections to enhance the accuracy of the computed present location of an LD receiver. A pseudorange correction signal PRC(t;i;j), presenting a correction of a pseudorange measurement made at time t at an LD receiver number i from an LD signal issued by an LD signal source number j, is transmitted at a consecutive sequence of times $t=t_0, t_1, t_2, \ldots, t_n$. The pseudorange correction signal PRC($t_n$;i;j), or a message sent in a time interval $t_{n-1} < t \leq t_n$, is encrypted, using an encryption key that is a function of and depends non-trivially upon one or more of the preceding pseudorange correction values PRC($t_k$;i;j) ($k \leq n-1$). This encryption key varies from one time interval $t_{n-1} < t \leq t_n$, to another as the collection of preceding pseudorange correction values changes. Several suitable encryption algorithms that depend upon one or more of the preceding pseudorange correction values are discussed.

39 Claims, 20 Drawing Sheets

| 1  | 13 | 23 | 2  | 22 | 15 | 1  | 3  | 27 | 14 | 4  | 2  | 8  | 21 |
|----|----|----|----|----|----|----|----|----|----|----|----|----|----|
| 13 | 9  | 5  | 14 | 12 | 7  | 25 | 27 | 6  | 9  | 26 | 1  | 24 | 25 |
| 9  | 4  | 20 | 26 | 8  | 10 | 19 | 5  | 7  | 18 | 11 | 6  | 17 | 7  |
| 13 | 10 | 14 | 15 | 12 | 11 | 15 | 26 | 10 | 11 | 10 | 16 | 25 | 9  |
| 11 | 20 | 10 | 27 | 21 | 5  | 6  | 3  | 13 | 5  | 25 | 11 | 8  | 22 |
| 8  | 11 | 25 | 12 | 8  | 7  | 27 | 6  | 26 | 7  | 15 | 27 | 6  | 12 |
| 12 | 17 | 9  | 9  | 1  | 18 | 19 | 14 | 21 | 10 | 4  | 1  | 11 | 24 |
| 5  | 17 | 16 | 8  | 7  | 21 | 23 | 16 | 2  | 21 | 19 | 20 | 22 | 1  |
| 7  | 4  | 9  | 15 | 17 | 24 | 2  | 18 | 3  | 3  | 19 | 13 | 8  | 20 |
| 8  | 12 | 2  | 2  | 3  | 1  | 17 | 2  | 2  | 2  | 19 | 16 | 10 | 5  |
| 6  | 9  | 4  | 25 | 18 | 6  | 3  | 4  | 7  | 14 | 1  | 6  | 3  | 13 |
| 13 | 18 | 10 | 23 | 5  | 1  | 22 | 2  | 26 | 6  | 5  | 9  | 3  | 19 |
| 5  | 10 | 27 | 6  | 18 | 14 | 1  | 17 | 11 | 18 | 27 | 1  | 15 | 16 |
| 12 | 11 | 5  | 26 | 11 | 8  | 7  | 9  | 17 | 2  | 16 | 1  | 18 | 18 |

FIG. 4A

| 21 | 17 | 7  | 3  | 20 | 1  | 23 | 5  | 16 | 15 | 4  | 22 | 5  | 18 |
|----|----|----|----|----|----|----|----|----|----|----|----|----|----|
| 25 | 7  | 6  | 2  | 24 | 3  | 23 | 3  | 14 | 22 | 4  | 8  | 15 | 21 |
| 7  | 24 | 12 | 16 | 6  | 14 | 15 | 19 | 5  | 4  | 4  | 13 | 14 | 21 |
| 9  | 10 | 17 | 6  | 2  | 9  | 18 | 12 | 3  | 26 | 19 | 8  | 20 | 7  |
| 22 | 3  | 8  | 13 | 4  | 3  | 3  | 23 | 2  | 10 | 21 | 12 | 24 | 1  |
| 12 | 16 | 23 | 4  | 9  | 5  | 22 | 11 | 20 | 13 | 15 | 19 | 25 | 16 |
| 24 | 5  | 2  | 9  | 20 | 23 | 1  | 19 | 26 | 22 | 25 | 22 | 4  | 24 |
| 1  | 2  | 11 | 20 | 21 | 25 | 23 | 19 | 16 | 3  | 18 | 21 | 4  | 24 |
| 20 | 12 | 14 | 21 | 17 | 1  | 4  | 24 | 1  | 27 | 11 | 3  | 23 | 3  |
| 5  | 15 | 2  | 17 | 2  | 18 | 10 | 17 | 21 | 23 | 22 | 6  | 20 | 2  |
| 13 | 1  | 2  | 2  | 4  | 2  | 3  | 21 | 1  | 2  | 18 | 3  | 5  | 19 |
| 19 | 12 | 17 | 4  | 4  | 16 | 7  | 2  | 20 | 7  | 9  | 10 | 13 | 13 |
| 16 | 1  | 16 | 8  | 8  | 22 | 16 | 3  | 1  | 6  | 22 | 17 | 1  | 18 |
| 18 | 25 | 15 | 4  | 4  | 23 | 4  | 2  | 7  | 4  | 14 | 8  | 1  | 27 |

FIG. 4B

| 12 | 11 | 5  | 26 | 11 | 8  | 7  | 9  | 17 | 2  | 16 | 1  | 18 | 18 |
|----|----|----|----|----|----|----|----|----|----|----|----|----|----|
| 11 | 8  | 7  | 19 | 10 | 7  | 11 | 10 | 10 | 17 | 3  | 15 | 3  | 9  |
| 9  | 13 | 14 | 16 | 8  | 6  | 12 | 1  | 19 | 4  | 21 | 3  | 14 | 2  |
| 10 | 20 | 8  | 12 | 27 | 3  | 1  | 16 | 5  | 14 | 24 | 13 | 2  | 5  |
| 19 | 13 | 7  | 15 | 1  | 20 | 27 | 1  | 13 | 13 | 1  | 19 | 6  | 27 |
| 6  | 9  | 21 | 2  | 5  | 13 | 12 | 23 | 24 | 1  | 12 | 17 | 10 | 4  |
| 18 | 9  | 17 | 4  | 27 | 3  | 13 | 15 | 14 | 6  | 14 | 22 | 4  | 3  |
| 11 | 5  | 14 | 11 | 22 | 7  | 20 | 21 | 26 | 2  | 27 | 14 | 11 | 17 |
| 6  | 10 | 1  | 7  | 8  | 26 | 16 | 3  | 25 | 6  | 9  | 15 | 21 | 11 |
| 27 | 21 | 26 | 12 | 12 | 8  | 5  | 7  | 13 | 25 | 1  | 12 | 14 | 15 |
| 23 | 4  | 13 | 24 | 20 | 25 | 22 | 6  | 24 | 18 | 17 | 25 | 4  | 15 |
| 25 | 11 | 22 | 27 | 25 | 23 | 11 | 19 | 21 | 13 | 9  | 20 | 24 | 8  |
| 21 | 7  | 22 | 4  | 22 | 19 | 7  | 3  | 14 | 21 | 15 | 21 | 17 | 18 |
| 26 | 20 | 24 | 10 | 5  | 12 | 6  | 10 | 23 | 23 | 18 | 8  | 24 | 19 |

FIG. 4C

| 18 | 25 | 15 | 11 | 4 | 23 | 4 | 2 | 7 | 4 | 14 | 8 | 1 | 27 |
|----|----|----|----|----|----|----|----|----|----|----|----|----|----|
| 9 | 12 | 10 | 9 | 17 | 12 | 8 | 22 | 5 | 2 | 12 | 13 | 24 | 23 |
| 2 | 4 | 26 | 26 | 21 | 9 | 3 | 21 | 3 | 26 | 23 | 5 | 26 | 3 |
| 5 | 15 | 2 | 20 | 25 | 20 | 15 | 4 | 16 | 14 | 15 | 18 | 20 | 14 |
| 27 | 3 | 20 | 19 | 19 | 24 | 21 | 6 | 19 | 2 | 24 | 16 | 27 | 18 |
| 4 | 18 | 11 | 16 | 5 | 18 | 24 | 10 | 25 | 19 | 7 | 25 | 15 | 7 |
| 3 | 26 | 23 | 25 | 22 | 12 | 25 | 17 | 5 | 2 | 26 | 11 | 6 | 17 |
| 17 | 10 | 13 | 15 | 26 | 7 | 25 | 20 | 8 | 25 | 1 | 16 | 4 | 6 |
| 11 | 21 | 24 | 9 | 27 | 9 | 23 | 4 | 23 | 24 | 14 | 26 | 9 | 8 |
| 15 | 26 | 16 | 10 | 22 | 21 | 15 | 27 | 16 | 21 | 26 | 15 | 16 | 24 |
| 15 | 8 | 14 | 13 | 8 | 20 | 6 | 18 | 11 | 9 | 15 | 7 | 10 | 12 |
| 8 | 19 | 27 | 22 | 5 | 17 | 16 | 18 | 23 | 24 | 22 | 14 | 23 | 17 |
| 18 | 9 | 20 | 16 | 1 | 20 | 2 | 17 | 10 | 18 | 27 | 19 | 16 | 13 |
| 19 | 23 | 11 | 9 | 25 | 20 | 17 | 19 | 26 | 8 | 22 | 12 | 17 | 27 |

FIG. 4D

| 20 | 1 | 5 | 19 | 3 | 20 | 10 | 3 | 1 | 1 | 18 | 10 | 19 | 18 |
|----|----|----|----|----|----|----|----|----|----|----|----|----|----|
| 4 | 3 | 2 | 20 | 25 | 15 | 27 | 2 | 15 | 10 | 15 | 1 | 4 | 7 |
| 17 | 23 | 16 | 3 | 2 | 26 | 27 | 21 | 14 | 9 | 17 | 18 | 25 | 8 |
| 14 | 20 | 24 | 25 | 20 | 3 | 10 | 10 | 1 | 7 | 11 | 10 | 7 | 8 |
| 26 | 18 | 12 | 3 | 16 | 4 | 17 | 11 | 14 | 6 | 21 | 17 | 6 | 3 |
| 22 | 14 | 4 | 11 | 1 | 20 | 7 | 13 | 16 | 20 | 22 | 2 | 24 | 23 |
| 12 | 23 | 1 | 21 | 17 | 11 | 2 | 5 | 14 | 18 | 2 | 2 | 6 | 16 |
| 6 | 10 | 13 | 18 | 24 | 26 | 19 | 15 | 6 | 17 | 25 | 17 | 11 | 24 |
| 20 | 19 | 21 | 5 | 7 | 12 | 1 | 12 | 21 | 7 | 11 | 16 | 10 | 8 |
| 14 | 1 | 8 | 27 | 2 | 14 | 3 | 7 | 25 | 6 | 26 | 5 | 13 | 14 |
| 9 | 13 | 10 | 10 | 24 | 11 | 15 | 26 | 4 | 15 | 6 | 24 | 4 | 12 |
| 7 | 3 | 15 | 6 | 2 | 13 | 3 | 5 | 6 | 4 | 19 | 17 | 8 | 5 |
| 21 | 27 | 26 | 1 | 23 | 8 | 9 | 2 | 10 | 25 | 7 | 18 | 11 | 9 |
| 1 | 16 | 22 | 5 | 27 | 19 | 18 | 17 | 21 | 8 | 17 | 16 | 14 | 16 |

FIG. 5A

| 18 | 5  | 19 | 8  | 22 | 9  | 18 | 22 | 8  | 7  | 21 | 20 | 8  | 1  |
| 7  | 4  | 20 | 7  | 9  | 2  | 7  | 19 | 21 | 15 | 17 | 24 | 27 | 27 |
| 8  | 13 | 21 | 7  | 6  | 5  | 8  | 6  | 11 | 10 | 10 | 1  | 10 | 13 |
| 8  | 23 | 14 | 15 | 8  | 10 | 24 | 23 | 18 | 27 | 3  | 12 | 14 | 26 |
| 3  | 3  | 7  | 4  | 12 | 4  | 20 | 12 | 4  | 4  | 5  | 21 | 26 | 8  |
| 23 | 7  | 11 | 15 | 6  | 27 | 13 | 2  | 9  | 11 | 6  | 24 | 6  | 26 |
| 16 | 4  | 23 | 4  | 11 | 1  | 26 | 9  | 2  | 22 | 5  | 25 | 25 | 3  |
| 24 | 5  | 20 | 22 | 24 | 25 | 2  | 8  | 12 | 23 | 7  | 27 | 1  | 5  |
| 8  | 10 | 19 | 20 | 4  | 9  | 24 | 2  | 3  | 27 | 8  | 13 | 9  | 27 |
| 14 | 1  | 4  | 5  | 10 | 7  | 20 | 27 | 11 | 14 | 9  | 10 | 6  | 5  |
| 12 | 3  | 6  | 13 | 5  | 14 | 14 | 2  | 14 | 15 | 1  | 18 | 16 | 27 |
| 5  | 18 | 3  | 16 | 6  | 1  | 1  | 17 | 1  | 6  | 27 | 20 | 16 | 17 |
| 9  | 12 | 27 | 22 | 24 | 15 | 25 | 26 | 13 | 4  | 23 | 14 | 23 | 25 |
| 16 | 10 | 2  | 11 | 23 | 2  | 16 | 15 | 3  | 4  | 20 | 22 | 24 | 3  |

FIG. 5B

| 1 | 16 | 22 | 5 | 27 | 19 | 18 | 17 | 21 | 8 | 17 | 16 | 14 | 16 |
|---|---|---|---|---|---|---|---|---|---|---|---|---|---|
| 15 | 6 | 15 | 7 | 12 | 9 | 8 | 24 | 9 | 9 | 10 | 8 | 11 | 13 |
| 21 | 23 | 20 | 21 | 22 | 19 | 20 | 10 | 18 | 18 | 20 | 24 | 19 | 23 |
| 15 | 17 | 14 | 9 | 11 | 26 | 8 | 17 | 10 | 7 | 12 | 12 | 5 | 3 |
| 11 | 10 | 16 | 22 | 14 | 12 | 21 | 19 | 22 | 22 | 23 | 13 | 15 | 18 |
| 27 | 18 | 1 | 9 | 7 | 20 | 12 | 2 | 22 | 8 | 11 | 4 | 17 | 1 |
| 14 | 23 | 3 | 16 | 16 | 22 | 21 | 3 | 15 | 15 | 23 | 25 | 17 | 24 |
| 26 | 8 | 8 | 19 | 27 | 27 | 20 | 9 | 7 | 21 | 27 | 1 | 25 | 6 |
| 26 | 25 | 15 | 26 | 4 | 11 | 16 | 10 | 4 | 3 | 25 | 2 | 20 | 2 |
| 18 | 11 | 24 | 19 | 1 | 20 | 10 | 8 | 20 | 1 | 9 | 21 | 13 | 8 |
| 12 | 23 | 17 | 15 | 23 | 23 | 27 | 12 | 19 | 5 | 1 | 22 | 25 | 18 |
| 27 | 10 | 19 | 18 | 14 | 19 | 11 | 20 | 23 | 2 | 22 | 24 | 10 | 11 |
| 1 | 5 | 26 | 23 | 13 | 18 | 17 | 9 | 1 | 6 | 8 | 24 | 9 | 11 |
| 1 | 18 | 1 | 2 | 12 | 7 | 3 | 13 | 2 | 25 | 12 | 7 | 18 | 14 |

FIG. 5C

| 16 | 10 | 2  | 11 | 23 | 2  | 16 | 15 | 3  | 4  | 20 | 22 | 24 | 3  |
|----|----|----|----|----|----|----|----|----|----|----|----|----|----|
| 13 | 22 | 11 | 24 | 13 | 25 | 26 | 14 | 26 | 12 | 2  | 27 | 21 | 14 |
| 23 | 17 | 17 | 5  | 25 | 2  | 25 | 18 | 16 | 20 | 19 | 26 | 15 | 20 |
| 3  | 6  | 24 | 4  | 12 | 1  | 27 | 13 | 27 | 2  | 27 | 3  | 19 | 27 |
| 18 | 24 | 23 | 19 | 24 | 13 | 9  | 17 | 20 | 24 | 26 | 9  | 21 | 25 |
| 1  | 16 | 3  | 17 | 17 | 8  | 14 | 1  | 26 | 5  | 18 | 13 | 10 | 6  |
| 24 | 22 | 21 | 18 | 26 | 24 | 20 | 15 | 24 | 17 | 19 | 4  | 22 | 23 |
| 6  | 1  | 2  | 3  | 5  | 9  | 25 | 4  | 16 | 19 | 25 | 2  | 20 | 3  |
| 2  | 3  | 25 | 21 | 5  | 25 | 22 | 4  | 4  | 26 | 23 | 27 | 5  | 24 |
| 8  | 5  | 14 | 23 | 7  | 24 | 15 | 6  | 22 | 9  | 16 | 26 | 23 | 17 |
| 18 | 6  | 21 | 13 | 22 | 7  | 14 | 8  | 15 | 20 | 18 | 16 | 21 | 17 |
| 11 | 25 | 18 | 12 | 21 | 13 | 8  | 14 | 26 | 15 | 16 | 27 | 26 | 19 |
| 11 | 2  | 7  | 10 | 5  | 3  | 23 | 19 | 8  | 4  | 23 | 6  | 24 | 25 |
| 14 | 3  | 4  | 15 | 9  | 6  | 16 | 4  | 27 | 17 | 5  | 19 | 5  | 6  |

FIG. 5D

| 8  | 3  | 22 | 4  | 18 | 27 | 21 | 17 | 6  | 19 | 5  | 10 | 20 | 11 |
|----|----|----|----|----|----|----|----|----|----|----|----|----|----|
| 12 | 9  | 15 | 1  | 15 | 22 | 16 | 13 | 10 | 17 | 2  | 17 | 23 | 12 |
| 16 | 1  | 7  | 13 | 5  | 4  | 6  | 16 | 4  | 15 | 1  | 15 | 26 | 7  |
| 10 | 7  | 11 | 24 | 9  | 7  | 4  | 10 | 2  | 9  | 13 | 12 | 27 | 22 |
| 23 | 17 | 17 | 25 | 10 | 1  | 11 | 7  | 24 | 25 | 17 | 7  | 18 | 18 |
| 26 | 24 | 20 | 23 | 22 | 3  | 13 | 11 | 26 | 23 | 15 | 4  | 22 | 19 |
| 5  | 15 | 25 | 22 | 24 | 5  | 24 | 4  | 27 | 27 | 16 | 2  | 10 | 15 |
| 2  | 8  | 27 | 27 | 27 | 18 | 26 | 21 | 18 | 21 | 23 | 14 | 12 | 13 |
| 14 | 5  | 21 | 15 | 23 | 16 | 18 | 1  | 19 | 18 | 27 | 22 | 13 | 4  |
| 1  | 12 | 13 | 20 | 21 | 20 | 27 | 2  | 22 | 12 | 9  | 19 | 5  | 3  |
| 3  | 13 | 8  | 11 | 11 | 24 | 14 | 9  | 21 | 10 | 19 | 24 | 4  | 1  |
| 11 | 18 | 4  | 7  | 12 | 13 | 3  | 3  | 20 | 14 | 7  | 20 | 1  | 6  |
| 22 | 19 | 1  | 2  | 16 | 14 | 1  | 5  | 13 | 6  | 11 | 21 | 7  | 5  |
| 19 | 25 | 3  | 5  | 13 | 10 | 8  | 8  | 23 | 20 | 21 | 9  | 6  | 9  |

FIG. 6A

| 11 | 2  | 12 | 26 | 5  | 22 | 8  | 19 | 18 | 1  | 25 | 7  | 4  | 24 |
|----|----|----|----|----|----|----|----|----|----|----|----|----|----|
| 12 | 3  | 9  | 23 | 9  | 19 | 6  | 17 | 13 | 8  | 12 | 10 | 2  | 20 |
| 7  | 9  | 6  | 11 | 20 | 15 | 21 | 23 | 4  | 3  | 9  | 14 | 1  | 11 |
| 22 | 6  | 8  | 25 | 23 | 5  | 27 | 11 | 1  | 6  | 5  | 19 | 11 | 7  |
| 18 | 17 | 18 | 22 | 16 | 1  | 23 | 7  | 3  | 19 | 8  | 24 | 16 | 4  |
| 19 | 22 | 14 | 16 | 17 | 3  | 13 | 5  | 10 | 27 | 6  | 27 | 19 | 1  |
| 15 | 23 | 10 | 27 | 10 | 12 | 10 | 3  | 12 | 23 | 2  | 21 | 14 | 2  |
| 13 | 19 | 2  | 17 | 13 | 17 | 4  | 10 | 16 | 15 | 1  | 15 | 12 | 10 |
| 4  | 18 | 22 | 9  | 11 | 2  | 1  | 15 | 17 | 2  | 10 | 11 | 5  | 8  |
| 3  | 11 | 25 | 4  | 6  | 9  | 12 | 20 | 22 | 9  | 19 | 8  | 27 | 19 |
| 1  | 13 | 16 | 1  | 2  | 7  | 9  | 25 | 27 | 21 | 23 | 4  | 23 | 25 |
| 6  | 12 | 11 | 3  | 1  | 10 | 3  | 26 | 24 | 1  | 21 | 2  | 25 | 22 |
| 5  | 26 | 4  | 15 | 4  | 14 | 7  | 2  | 20 | 13 | 24 | 1  | 26 | 18 |
| 9  | 27 | 20 | 7  | 7  | 21 | 14 | 1  | 14 | 17 | 18 | 3  | 18 | 27 |

FIG. 6B

| 19 | 25 | 3  | 5  | 13 | 10 | 8  | 8  | 23 | 20 | 21 | 9  | 6  | 9  |
|----|----|----|----|----|----|----|----|----|----|----|----|----|----|
| 17 | 22 | 9  | 3  | 14 | 12 | 2  | 15 | 17 | 5  | 3  | 5  | 9  | 10 |
| 25 | 26 | 2  | 6  | 7  | 15 | 5  | 25 | 8  | 1  | 6  | 18 | 17 | 17 |
| 27 | 10 | 12 | 8  | 2  | 25 | 9  | 22 | 9  | 4  | 4  | 13 | 14 | 16 |
| 13 | 2  | 19 | 9  | 4  | 26 | 12 | 24 | 14 | 3  | 14 | 1  | 21 | 21 |
| 9  | 11 | 23 | 16 | 1  | 23 | 17 | 18 | 5  | 16 | 12 | 3  | 25 | 24 |
| 7  | 6  | 24 | 14 | 3  | 21 | 23 | 19 | 3  | 22 | 10 | 6  | 24 | 27 |
| 6  | 14 | 26 | 12 | 6  | 11 | 22 | 27 | 1  | 24 | 18 | 16 | 19 | 20 |
| 4  | 16 | 18 | 18 | 8  | 17 | 15 | 26 | 7  | 26 | 20 | 27 | 16 | 26 |
| 15 | 21 | 14 | 21 | 20 | 9  | 25 | 23 | 16 | 13 | 24 | 25 | 3  | 23 |
| 21 | 20 | 16 | 10 | 17 | 8  | 20 | 20 | 12 | 11 | 26 | 11 | 8  | 14 |
| 20 | 23 | 10 | 17 | 19 | 6  | 10 | 14 | 11 | 8  | 25 | 23 | 2  | 25 |
| 18 | 27 | 5  | 19 | 26 | 2  | 19 | 12 | 15 | 7  | 22 | 8  | 11 | 8  |
| 24 | 4  | 6  | 26 | 25 | 19 | 7  | 6  | 25 | 2  | 8  | 26 | 15 | 2  |

FIG. 6C

| 9 | 27 | 20 | 7 | 7 | 21 | 14 | 1 | 14 | 17 | 18 | 3 | 18 | 27 |
|---|---|---|---|---|---|---|---|---|---|---|---|---|---|
| 10 | 21 | 24 | 6 | 3 | 24 | 19 | 4 | 26 | 22 | 16 | 9 | 24 | 26 |
| 17 | 24 | 26 | 18 | 8 | 26 | 26 | 8 | 19 | 25 | 17 | 12 | 20 | 21 |
| 16 | 20 | 17 | 21 | 12 | 25 | 22 | 6 | 25 | 12 | 13 | 16 | 22 | 17 |
| 21 | 25 | 27 | 24 | 15 | 20 | 25 | 14 | 9 | 7 | 14 | 18 | 17 | 23 |
| 24 | 14 | 23 | 20 | 18 | 27 | 16 | 9 | 6 | 4 | 15 | 22 | 13 | 13 |
| 27 | 16 | 21 | 19 | 22 | 23 | 18 | 12 | 7 | 5 | 11 | 23 | 15 | 16 |
| 20 | 10 | 13 | 12 | 21 | 18 | 24 | 21 | 2 | 10 | 7 | 25 | 21 | 15 |
| 26 | 15 | 15 | 13 | 27 | 6 | 20 | 16 | 5 | 16 | 4 | 26 | 10 | 3 |
| 23 | 8 | 7 | 10 | 25 | 8 | 15 | 13 | 11 | 14 | 20 | 20 | 7 | 5 |
| 14 | 4 | 5 | 14 | 26 | 11 | 2 | 18 | 8 | 18 | 3 | 17 | 9 | 6 |
| 25 | 7 | 3 | 8 | 19 | 13 | 5 | 27 | 15 | 20 | 27 | 13 | 3 | 9 |
| 8 | 5 | 1 | 6 | 24 | 16 | 11 | 24 | 21 | 24 | 26 | 6 | 6 | 14 |
| 2 | 1 | 19 | 2 | 14 | 4 | 17 | 22 | 23 | 26 | 22 | 5 | 8 | 12 |

FIG. 6D

| 10 | 3  | 13 | 2  | 19 | 5  | 13 | 9  | 21 | 16 | 3  | 18 | 12 | 11 |
|----|----|----|----|----|----|----|----|----|----|----|----|----|----|
| 8  | 18 | 16 | 13 | 17 | 26 | 15 | 10 | 4  | 27 | 2  | 7  | 25 | 27 |
| 11 | 1  | 14 | 15 | 20 | 6  | 12 | 12 | 20 | 18 | 15 | 19 | 23 | 10 |
| 22 | 27 | 12 | 1  | 18 | 3  | 4  | 7  | 3  | 17 | 17 | 6  | 11 | 9  |
| 7  | 9  | 26 | 14 | 3  | 7  | 16 | 13 | 19 | 15 | 1  | 15 | 10 | 13 |
| 21 | 20 | 27 | 16 | 21 | 25 | 3  | 27 | 1  | 13 | 16 | 20 | 14 | 12 |
| 20 | 4  | 3  | 12 | 16 | 4  | 27 | 5  | 22 | 26 | 12 | 5  | 13 | 3  |
| 1  | 8  | 11 | 17 | 22 | 24 | 14 | 14 | 16 | 25 | 27 | 26 | 24 | 26 |
| 19 | 2  | 15 | 18 | 4  | 23 | 17 | 11 | 17 | 4  | 10 | 14 | 15 | 14 |
| 4  | 17 | 25 | 24 | 5  | 14 | 25 | 4  | 2  | 11 | 20 | 1  | 7  | 15 |
| 12 | 19 | 4  | 11 | 11 | 21 | 5  | 6  | 25 | 24 | 13 | 24 | 26 | 1  |
| 2  | 10 | 17 | 21 | 12 | 15 | 18 | 26 | 24 | 10 | 19 | 4  | 8  | 2  |
| 18 | 11 | 10 | 3  | 14 | 12 | 6  | 2  | 13 | 23 | 4  | 17 | 9  | 8  |
| 9  | 21 | 23 | 20 | 15 | 13 | 11 | 25 | 18 | 12 | 18 | 8  | 17 | 24 |

FIG. 7A

| 11 | 27 | 26 | 11 | 12 | 5  | 9  | 14 | 4  | 1  | 8  | 13 | 3  | 6  |
|----|----|----|----|----|----|----|----|----|----|----|----|----|----|
| 27 | 1  | 8  | 27 | 11 | 9  | 24 | 13 | 21 | 9  | 7  | 12 | 2  | 7  |
| 10 | 2  | 25 | 12 | 15 | 6  | 12 | 7  | 5  | 3  | 24 | 14 | 25 | 22 |
| 9  | 24 | 13 | 10 | 13 | 27 | 8  | 15 | 3  | 19 | 22 | 11 | 1  | 5  |
| 13 | 26 | 24 | 15 | 1  | 4  | 25 | 6  | 22 | 20 | 4  | 27 | 9  | 23 |
| 12 | 4  | 3  | 26 | 10 | 22 | 2  | 17 | 19 | 4  | 6  | 26 | 26 | 24 |
| 3  | 25 | 23 | 14 | 14 | 11 | 13 | 5  | 20 | 18 | 21 | 1  | 23 | 4  |
| 26 | 23 | 4  | 25 | 16 | 23 | 1  | 16 | 24 | 2  | 5  | 10 | 27 | 9  |
| 14 | 3  | 2  | 9  | 2  | 10 | 11 | 19 | 18 | 10 | 3  | 15 | 24 | 25 |
| 15 | 21 | 7  | 23 | 7  | 12 | 7  | 8  | 6  | 21 | 9  | 2  | 22 | 8  |
| 1  | 10 | 12 | 3  | 9  | 24 | 26 | 4  | 23 | 12 | 20 | 9  | 4  | 3  |
| 2  | 12 | 1  | 21 | 17 | 7  | 10 | 20 | 7  | 17 | 2  | 16 | 8  | 27 |
| 8  | 11 | 21 | 22 | 8  | 25 | 6  | 23 | 2  | 13 | 17 | 25 | 19 | 19 |
| 24 | 19 | 6  | 24 | 27 | 13 | 14 | 18 | 14 | 23 | 18 | 3  | 7  | 26 |

FIG. 7B

| 9  | 21 | 23 | 20 | 15 | 13 | 11 | 25 | 18 | 12 | 18 | 8  | 17 | 24 |
|----|----|----|----|----|----|----|----|----|----|----|----|----|----|
| 23 | 7  | 2  | 9  | 2  | 16 | 22 | 15 | 26 | 3  | 6  | 3  | 27 | 7  |
| 3  | 22 | 24 | 19 | 13 | 9  | 2  | 3  | 23 | 19 | 7  | 21 | 22 | 17 |
| 15 | 5  | 5  | 25 | 24 | 22 | 19 | 1  | 15 | 2  | 5  | 2  | 16 | 16 |
| 26 | 12 | 22 | 22 | 1  | 8  | 9  | 19 | 8  | 9  | 21 | 16 | 5  | 5  |
| 14 | 13 | 18 | 26 | 25 | 27 | 26 | 20 | 9  | 1  | 11 | 10 | 21 | 6  |
| 25 | 24 | 6  | 10 | 23 | 10 | 24 | 24 | 12 | 14 | 22 | 12 | 1  | 21 |
| 24 | 23 | 9  | 23 | 10 | 20 | 1  | 8  | 11 | 8  | 14 | 13 | 18 | 18 |
| 13 | 15 | 1  | 7  | 6  | 2  | 21 | 17 | 10 | 20 | 26 | 9  | 6  | 4  |
| 5  | 25 | 19 | 6  | 9  | 19 | 20 | 23 | 14 | 6  | 8  | 25 | 2  | 23 |
| 27 | 6  | 20 | 4  | 7  | 11 | 7  | 18 | 5  | 21 | 23 | 11 | 20 | 19 |
| 16 | 14 | 7  | 5  | 27 | 17 | 23 | 16 | 27 | 5  | 25 | 23 | 19 | 25 |
| 6  | 16 | 21 | 27 | 26 | 18 | 8  | 22 | 6  | 22 | 24 | 27 | 3  | 22 |
| 17 | 26 | 8  | 8  | 8  | 1  | 10 | 21 | 7  | 7  | 9  | 22 | 4  | 20 |

FIG. 7C

| 24 | 19 | 6  | 24 | 27 | 13 | 14 | 18 | 14 | 23 | 18 | 3  | 7  | 26 |
|----|----|----|----|----|----|----|----|----|----|----|----|----|----|
| 7  | 22 | 22 | 13 | 18 | 3  | 23 | 9  | 25 | 8  | 19 | 8  | 20 | 21 |
| 17 | 20 | 11 | 6  | 5  | 26 | 19 | 22 | 8  | 22 | 15 | 17 | 5  | 20 |
| 16 | 5  | 17 | 8  | 6  | 8  | 27 | 2  | 9  | 14 | 16 | 24 | 18 | 17 |
| 5  | 9  | 5  | 16 | 19 | 21 | 20 | 24 | 1  | 24 | 14 | 18 | 14 | 13 |
| 6  | 8  | 27 | 20 | 25 | 2  | 15 | 1  | 16 | 5  | 10 | 4  | 6  | 10 |
| 21 | 17 | 14 | 19 | 3  | 18 | 22 | 10 | 13 | 25 | 23 | 23 | 16 | 2  |
| 18 | 15 | 20 | 17 | 21 | 14 | 3  | 21 | 26 | 11 | 12 | 7  | 21 | 16 |
| 4  | 6  | 9  | 5  | 20 | 1  | 17 | 27 | 10 | 15 | 27 | 19 | 17 | 12 |
| 23 | 7  | 19 | 2  | 4  | 20 | 5  | 3  | 27 | 7  | 11 | 20 | 11 | 18 |
| 19 | 16 | 15 | 18 | 26 | 15 | 21 | 26 | 12 | 26 | 13 | 5  | 15 | 1  |
| 25 | 18 | 10 | 4  | 23 | 17 | 18 | 11 | 17 | 16 | 1  | 21 | 12 | 11 |
| 22 | 13 | 16 | 1  | 24 | 16 | 16 | 12 | 15 | 27 | 26 | 22 | 13 | 15 |
| 20 | 14 | 18 | 7  | 22 | 19 | 4  | 25 | 11 | 6  | 25 | 6  | 10 | 14 |

FIG. 7D

SECURE COMMUNICATION OF INFORMATION

TECHNICAL FIELD

This invention relates to encryption of electromagnetic wave communications to and from a mobile receiver that uses present and past mobile receiver location information to vary the encryption key.

BACKGROUND OF THE INVENTION

In the past 20 years, many electronic location determination (LD) systems have been introduced that can determine, with varying inaccuracies, the present location of a mobile receiver. The LD system can be based on electromagnetic signals received frown satellites, such as the Global Positioning System (GPS), the Global Navigation Satellite System (GLONASS), and the ORBCOMM system. The LD system can also be based on electromagnetic signals received from ground-based systems (usually, but not necessarily, fixed in location), such as LORAN-C, TACAN, DECCA, OMEGA, JTIDS Relnav and the Position Locating and Reporting System (PLRS). Many of these LD systems are summarized in Tom Logsdon, *The Navstar Global Positioning System,* Van Nostrand Reinhold, New York, 1992, pp. 17–47, incorporated by reference herein.

In many instances, an LD system is used to determine the location of a mobile station, containing an LD system antenna and receiver/processor, and the results are transmitted to a central station for further processing and/or storage. The results transmitted by the mobile station may be the raw measurements made at that station, or may be the results of partial or full processing of these measurements at that station. In many situations, the location of the mobile station and the time the LD measurements were made are sensitive or proprietary, and the mobile station user prefers that this location information, as well as other related sensitive information, be transmitted and received confidentially. For example, if a geological survey team is conducting a mineral or petroleum survey of a large area of land, extending over several days or weeks, and is periodically transmitting its findings to a central station for analysis and storage, the team will wish to keep its results, and the locations corresponding to these results, confidential and unavailable to anyone else who receives these transmitted messages.

One attractive method of assuring confidentiality is to encrypt the transmitted data. If a single, static code or cipher is used for such transmissions, the great amount of data transmitted by the mobile station using such a code or cipher allows an eavesdropper greater opportunity to decode or decipher the encrypted data by looking for similarities in these data and working backward to determine the cleartext or non-encrypted data.

A satellite-based or ground-based LD system can provide for transmission of messages, including but not limited to present location information, but provides no security for such messages. Security concerns are two-told here: (1) a concern that no unauthorized person obtain access to the information contained in such messages (Type 1 security) and (2) a concern that no unauthorized person obtain access to and make adulterating changes in this information before such information is received by its intended recipients (Type 2 security). Type 1 security is a concern if the information transmitted is, or will be used as a basis for preparation of, confidential or proprietary information. Type 2 security is a concern in transmission of confidential or non-confidential information, such as financial transactions information, where accuracy is of greater importance than secrecy.

Hermann, in U.S. Pat. No. 4,102,521, discloses a system for coding guidance signals that are produced at a central station and transmitted to a self-propelled vehicle, such as a missile or guidable satellite, that is to be guided or whose control surfaces are to be adjusted from time to time. The length of the coded signal is kept low, and transmission of the coded signal is immediately preceded by transmission of a noise signal with uniform power density per unit frequency interval, to frustrate attempts to jam or interfere with transmission and receipt of the coded signal. The coded signal, when received by the vehicle, is decoded and applied to guide or control the vehicle. The concern here is interference with receipt by the intended recipient (the vehicle) of the transmitted message, not receipt and comprehension of the guidance signal by some other entity. Coding and anti-interference measures, but not encryption and decryption, are employed.

Teeter et al disclose use of pseudo-noise modulations and specific address encoding to permit multiple conversations or signal transmissions between a central station and a plurality of vehicles, or between the vehicles, in U.S. Pat. No. 4,117,271. A receiver for such (broadcast) signals is provided with a filter that accepts only signals with the proper address coding and disposes of all other messages. The encoded address also identifies the source of the message. The inventors note that this technique is useful only over modest ranges and that the most suitable frequency range is tens of kilohertz up to tens of megahertz.

Encryption using destination addresses using a TDMA satellite communications system is disclosed in U.S. Pat. No. 4,418,415, issued to Fennel et al. A common encryption/deception key is held by all authorized users of a network. This key is EXclusively ORed with the specified destination address, and the output (digital) signal is passed through an encryption engine, on the satellite and at the intended ground-based receiver, using the same key or another key. The encryption engine output signal is then combined with the channel data to be transmitted in another EXclusive OR circuit and transmitted to the network users. Each of the receivers receives the message and reverses the encryption process, using its own destination address as part of the decryption key. However, only the (single) intended receiver produces a cleartext message that is comprehensible.

Hanas et al, in U.S. Pat. No. 4,709,266, disclose use of s satellite scrambling network to provide messages that are scrambled or encrypted differently for different geographical regions. This is useful for distributing scrambled video, voice and data subscriber messages. A master uplink message (ground-to-satellite) is used to control the scrambling or encryption commands that determine the scrambling applied to each geographical area and/or to groups of individual subscribers.

U.S. Pat. No. 4,739,510, issued to Jeffers et al, discloses insertion of digitized audio and control signals in the horizontal blanking intervals of a television signal. The control signals appear as frames or packets, with a header containing a group address, synchronization and program-related information. A second portion of the header, containing control information addressed only to one or more specified receiver units, allows control of certain receiver functions at the transmission end of the system. The system uses several tiers of message authorization levels and a common audio or video key that is encrypted differently for use by each receiving authorized receiver. An authorized receiver receives only the information intended for that receiver, and unauthorized receivers receive only a scrambled message.

A satellite communication system for financial institutions, with message authentication, is disclosed by Laurance et al in U.S. Pat. No. 4,860,352. Specification of the transmitter position is appended to the message transmitted. The receiver authenticates the message by first comparing this transmitted position information with the actual transmitter information stored in the receiver system. If the two sets of transmitter position information do not agree, the receiver discards the remainder of this message as originating from an invalid sender.

Horne, in U.S. Pat. No. 4,887,296, discloses a three-key cryptographic system for a direct broadcast satellite system, to be used in video broadcasting to a plurality of ground-based receivers, each having a unique address number. A signature key, which is an encryption using the address number for that receiver, is stored in the receiver at the time of manufacturing. At the transmitter, a common key is encrypted, using the unique signature key for a receiver that is targeted for a portion of the message to be transmitted. The data stream contains message portions intended for all receivers and message portions intended for, and decryptable only by, individual receivers. A target receiver decrypts its messages, using the common key and signature key used by the transmitter to encrypt the receiver's portions of the message.

A system for encryption and decryption of voice and data transmissions to and from an aircraft is disclosed in U.S. Pat. No. 4,903,298, issued to Cline. The encryption unit is selectively inserted in, and removed from, the audio path between a radio transmitter and a receiver, one of which is located on an aircraft. This feature is intended to be used by businesspersons, travelling by air, who need occasional contact with their associates on the ground.

U.S. Pat. No. 4,916,737, issued to Chomet et al, discloses an anti-piracy television program scrambling/descrambling system that allows the encryption/decryption code to be changed periodically (e.g., once per month) by communication from the head end or central station. The receiver's decryption unit has an unalterable ROM portion, containing its unique serial or address number, and an EPROM portion, containing an alterable ROM portion with a look-up table that can be changed by receipt of special signals from the head end.

Kolbert discloses use of parallel transmission of "real" data and "junk" data to all recipients, to mask which user is the intended recipient of a message, in U.S. Pat. No. 4,932,057. The system is intended to be used where several different systems on an aircraft (e.g., communication, navigation, visual display) receive different subsets of data, some of which are confidential. The radiation produced by transmission along hardwired circuits in parallel allegedly masks the message and the intended recipient.

U.S. Pat. No. 4,972,431, isssued to Keegan, discloses a method of decryption of encrypted P-code signals in a Global Positioning System (GPS). The encrypted binary signals are squared using a relatively narrow bandwidth so that each GPS satellite signal can be separated from the other signals and so that the GPS carrier phase and pseudorange signals can be recovered from the composite signal. The signal-to-noise ration is kept reasonably high so that very weak signals can be received and analyzed.

An encrypted satellite communications system with relatively easy rekeying is disclosed by Leopold in U.S. Pat. No. 4,993,067. The contemplated provides communications between a satellite and all ground receivers in a defined geographic area. A message received by or from a receiver located in an improper receiver area is discarded. A designated ground receiver transmits a rekeying request to the satellite. The satellite determines whether the rekeyed areas correspond to geographically permitted areas. If the answer is affirmative, the satellite transmits rekeying instructions to change the geographical configuration of the ground-based receivers, either immediately or at a previously selected time.

Geographically defined lock-out of direct broadcast satellite signals, such as pay-per-view television, is also disclosed by Jeffers et al in U.S. Pat. No. 5,036,537. Before the broadcast, each receiver in the geographic area intended to be lock out is addressed and prevented from receiving that broadcast, using a blackout tier system that determines which receivers are to be locked out, based upon a designation code assigned to that receiver.

U.S. Pat. No. 5,113,443, issued to Brockman, discloses a method for scrambling a satellite communication by (1) encoding and modulating different portions of the communication onto different carrier frequencies to form a total signal and (2) transmitting the total signal to a ground station using the different frequency channels. The ground station receives the transmitted signal, decodes the individual channel signals using the known carrier frequencies, and accumulates the signal as a decoded whole. Only an authorized ground station possessing a key can decode and properly sum the received signals to produce the message originally transmitted from the satellite.

Esserman et al disclose signal encryption apparatus for satellite communications that generates a plurality of distinct keys, in U.S. Pat. No. 5,115,467. A secret common key is combined with distinct parameter data (unique to a particular station) to produce a distinct key for communications transmitted to that station.

A global communications system for transmitting encrypted messages to each of a plurality of different geographic areas is disclosed by Davis et al in U.S. Pat. No. 5,129,095. One or more satellites communicates with ground stations in each distinct geographic area by use of identification words on different channels. The system is intended for use in paging selected users in a plurality of countries.

In U.S. Pat. No. 5,210,534, Janex discloses an encoding method for exchange of navigation information between sea vessels. When coordinated movement of the vessels is desired, the vessels communicate using encoded messages drawn from a fixed glossary of such messages.

Cross, in U.S. Pat. No. 5,221,925, discloses a location interrogation system in which a mobile unit, upon receipt of an interrogation signal, transmits its present location in a conventionally encoded format to a central station that has issued the interrogation signal, to assist in tracking the mobile unit.

A communication system for control of access to a location-sensitive remote database is disclosed in U.S. Pat. No. 5,243,652, issued to Teare et al. A central station stores and transmits encrypted television material whose encryption key is available only for a viewers in a specified geographical area, as determined by a GPS or Loran location determination system.

Transmission of encrypted information packages from a central site to a remote site, in response to receipt of a request for specified information from that site, is disclosed in U.S. Pat. No. 5,247,575, issued to Sprague et al. The encryption key is changed periodically (e.g., weekly), but does not depend upon any past information.

Molva et al, in U.S. Pat. No. 5,347,580, disclose an authentication method using a smartcard to encrypt the presently displayed time with a cryptographically strong key. A public work station receives the encrypted time message, generates one or more values from this message, and further encrypts and/or transmits these values to a server station. The server station uses the received values to authenticate the holder of the smartcard and to accept or reject a message or command frown the holder.

U.S. Pat. No. 5,365,585, issued to Pohl et al, discloses a method for encryption using a feedback register with selectable taps and having an input terminal that receives an additional signal. The register produces a pseudorandom, encrypted output signal and can be used for encryption and decryption of messages.

What is needed is an approach for encrypting a message transmitted by an mobile LD station, where the encryption parameters change with time in a manner that is determinable by a station with knowledge of the present and/or preceding location coordinates or other location indicia of the transmitting station. Preferably, the encryption parameters change as the location of the station changes, using one or more coding algorithms that depend upon the present or recent location data. Preferably, this approach should allow temporary cutoff of transmission when the magnitude of the velocity of the mobile station is either zero or is below a small velocity threshold so that an eavesdropper has less information to use for decoding information contained in the messages transmitted.

SUMMARY OF THE INVENTION

These needs are met by the invention, which provides method and apparatus for encrypting location data and other information measured by a mobile LD station and for transmitting these data to all, or to a selected subset of, intended recipients of such messages. After the message, encrypted or cleartext, is received by a mobile receiver, the message can be forwarded to the intended recipient(s) by a terrestrial communications link, such as X.25 or X.31 or another packet switched public (telephone) network. Preferably, the data portion of the message is not transformed or otherwise analyzed until the message reaches the selected recipient(s). Alternatively, the terrestrial communications link could examine a specified bit or group of bits in the frame or packet transmitted that indicates whether this message is encrypted or is cleartext. If the message is encrypted, a special route or priority could be assigned for transport of the message across the network to the selected recipient.

The selected recipient determines whether the message is encrypted. If the message is encrypted, a decryption technique, agreed upon in advance by sender and recipient, is applied to produce a readable message for that recipient. The encryption/decryption process may be a single key process, such as the Data Encryption Standard (DES) developed by IBM, or may be a public key process, such as the recently developed RSA process. The header and/or trailer of any satellite message would include one or more bits indicating: (1) whether this message is encrypted; (2) the beginning and end of the encrypted portion, if any, of this message; and/or (3) an identification by alphanumeric symbols of the key to be used by the recipient to decrypt any encrypted portion of this message. When the selected recipient's receiver receives an encrypted message and an identification of the decryption key to be used, the receiver could automatically route this message to a decryption module that would read the key identification bits and apply the correct decryption key.

The invention may be enhanced by incorporation of additional features. For example, the decryption key identification bits could specify any of two or more degrees of sensitivity associated with this message, or with the transmitting or receiving station. A higher sensitivity message would use an encryption/decryption key of correspondingly greater complexity and would be used less often than a key associated with a lower sensitivity message.

DETAILED DESCRIPTION OF THE INVENTION

Figure 1:
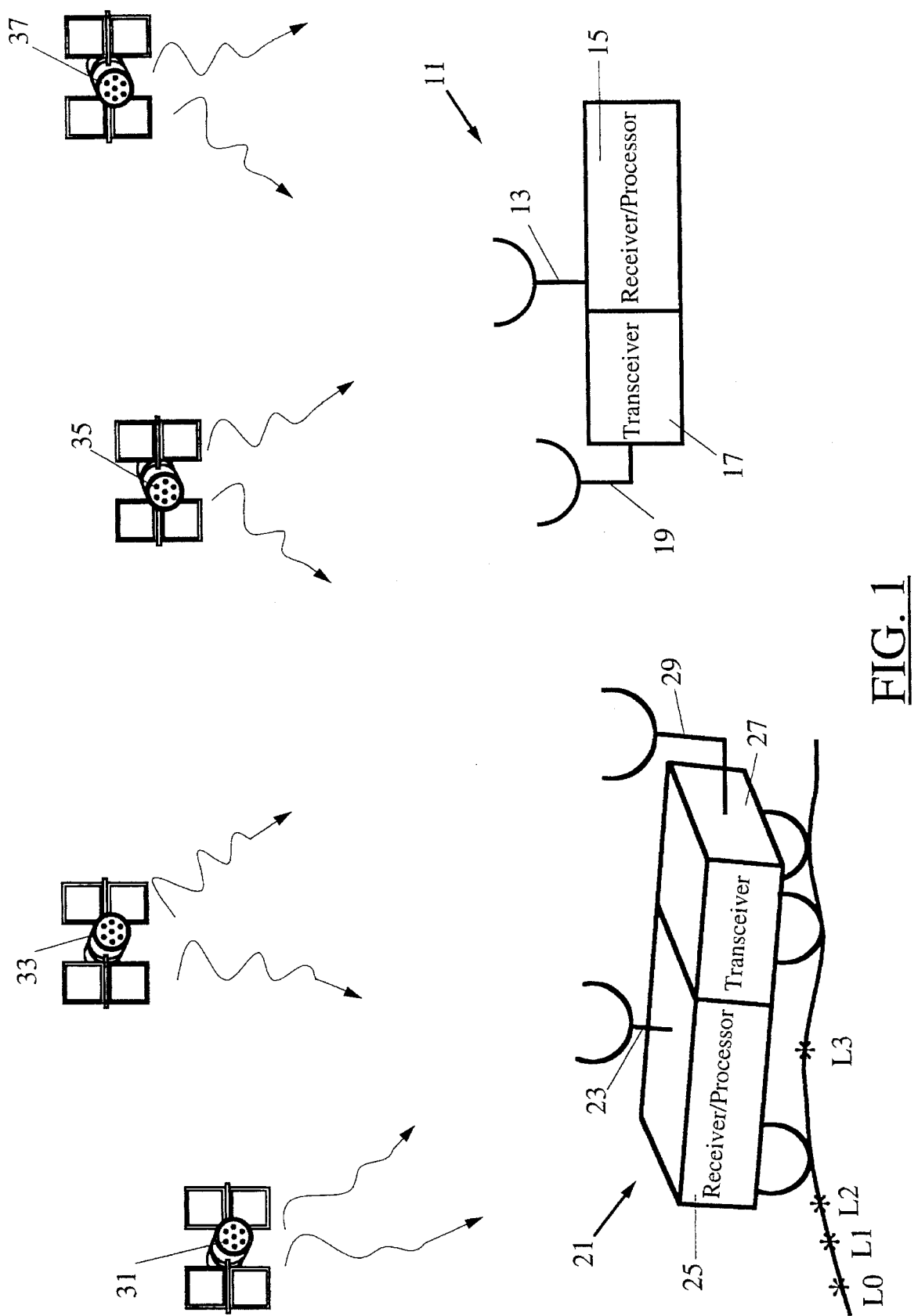
FIGS. 1 and 2 illustrate use of the invention for a satellite-based LD system and for a ground-based LD system, respectively.

FIG. 1 illustrates use of a satellite-based LD system, in which a first Satellite Positioning System (SATPS) station 11 (fixed in place or moving with known location coordinates as a function of time t) serves as a reference LD station and includes an SATPS signal antenna 13 and associated SATPS signal receiver/processor 15, a transceiver 17 and associated transceiver antenna 19. A second SATPS station 21 serves as a mobile or roving LD station and includes an SATPS signal antenna 23 and associated SATPS signal receiver/processor 25, a second transceiver 27 and associated transceiver antenna 29. The roving station 21 is located at three or more different locations L0, L1, L2 and L3 at different times. Each of the two SATPS antennas 13 and 23 receives SATPS signals from a plurality (preferably two or more) SATPS satellites 31, 33, 35 and 37 and measures the (uncorrected) pseudorange PR(t;i;j) from that station (numbered i) to the particular SATPS satellite (numbered j) that is the source of the LD signals. From these pseudorange measurements, the reference LD station 11 and the roving LD station 21 independently determine the (uncorrected) SATPS determined location coordinates of the SATPS antenna for that station.

The reference station 11 also determines, from its known pseudoranges as functions of time, the differential SATPS ("DSATPS") adjustments of measured pseudorange values required so that the SATPS-determined location coordinates agree with the known location coordinates of the reference station at the time these pseudorange values are measured. The DSATPS adjustments of pseudorange values for the reference station 11 are periodically transmitted to the roving station 21 so that the roving station can adjust its own SATPS-determined pseudorange values and location coordinates as time passes, by use of SATPS differential positioning. A correction or adjustment for station i (i=reference or i=mobile) of the pseudorange measurement made from an SATPS signal received from satellite number j at time $t=t_n$ is denoted $PRC(t_n;i;j)$.

Assume that the roving station 21, initially at location L0 at time $t=t_0$, begins to move and is at the locations L1, L2 and L3 at the subsequent times $t=t_1$, $t_2$ and $t_3$, respectively, as illustrated in FIG. 1. The reference and roving LD stations 11 and 21 are assumed to index and store the same pseudorange corrections $PRC(t_n;i;j)$ for the times $t=t_n$ at which the uncorrected pseudorange measurements $PR(t_n;i;j)$ are received by the reference station 11. Thus, at any time $t=t_n$ corresponding to location Ln for the roving station 21, the roving station has received and stored the pseudorange corrections $PRC(t_k;i;j)$ for $k=0, 1, \ldots, n-1$ but has not yet received or stored the pseudorange corrections $PRC(t_n;i;j)$.

If the reference station 11 or the roving station 21 wishes to communicate a message to the other station or to a central station 3 1 at a time t lying in the interval $t_{n-1} < t \leq t_n$, the transmitting station encrypts this message, using one or more of the pseudorange correction values $PRC(t_k;i;j)$ ($k=0, 1, 2, \ldots, n-1$) to determine one or more parameters in the encryption key. The manner of encryption is known to both the reference station and the roving station, and both stations can determine the encryption key parameters to be used, based upon the pseudorange correction values $PRC(t_k;i;j)$ ($k=0, 1, 2, \ldots, n-1$). The transmitting station encrypts the message contents, which may include pseudorange correction values, such as $PRC(t_n';i;j')$ with $t_n' > t_n$ and $j \neq j'$ and $PRC(t_n;i;j)$, and may include other information as well. The key for this encryption process uses one or more of the pseudorange correction values $PRC(t_k;i;j)$ ($k=0, 1, 2, \ldots, n-1$) as a parameter that determines the encryption key used for this message. The particular encryption key used by the transmitting and receiving stations is arbitrary but must contain or depend upon the values of at least one component of one or more of the preceding pseudorange correction values $PRC(t_k;i;j)$ in a non-trivial manner. Symbolically, the encryption key or algorithm, denoted $K_n \equiv KEY(t_n;i;j)$, for a message transmitted at a time t in the interval $t_{n-1} < t \leq t_n$ depends upon or is a function F of one or more of the preceding pseudorange correction values $PRC(t_k;i;j)$ for preceding times, viz $$KEY(t_n;i;j) = F[PRC(t_0;i;j), \ldots, PRC(t_{n-1};i;j)] (t_{n-1} < t \leq t_n) \quad (1)$$

The dependence of the encryption key or algorithm upon the preceding pseudorange correction values is required to be "non-trivial" in the sense that at least one preceding pseudorange index integer u exists ($0 \leq u \leq n-1$) for which the encryption key or associated algorithm satisfies $$PRC(t_{n-1};i;j)] \neq F[PRC(t_0;i;j), \ldots, PRC(T_{u-1};i;j), PRC(t_u;i;j)_b, PRC(t_{u+1};i;j), \ldots, PRC(t_{n-1};i;j)] \quad (2)$$

if the particular pseudorange values $PRC(t_u;i;j)_a$ and $PRC(t_u;i;j)_b$ are not equal.

Optionally, this encrypted message is augmented by inclusion of one or more of the pseudorange correction value or values $PRC(t_k;i;j)$ used for encryption of this message. When the receiving station then receives this encrypted message, the receiving station first decrypts a portion of the augmented message that indicates the value(s) of the pseudorange correction(s) used for the encryption. If (and only if) the value(s) of the pseudorange corrections used for the encryption of the message agrees with the pseudorange correction value(s) expected by the receiving station from the transmitting station, the receiving station concludes that this message was validly transmitted by the transmitting station, and the receiving station decrypts the remainder of the augmented message. If one or more of the pseudorange correction values disagrees with the values expected by the receiving station from the transmitting station, the receiving station concludes that this received message is invalid and discards or ignores this message. This approach allows authentication of the sender or transmitting station. Each transmitting station receiving station pair may have its own key or several pairs may share a key and receipt and decryption of an encrypted message received frown the now-authenticated transmitting station.

This approach to message encryption has several attractive features. (1) This approach is symmetric so that the reference station 11 and the mobile or roving station 21 may use the same procedure to communicate with each other. (2) This approach provides authentication or validation of the sender and decryption of the message as two sequential steps. If the message transmitted is not validated, the receiving station merely discards or ignores the remainder of the augmented message and wastes no more time on message decryption. (3) The encryption key may use as many of the preceding pseudorange correction values (in a non-trivial manner) as is warranted, to increase or reduce the security level for sender validation and message decryption. (4) This approach allows communication of the reference station with a plurality of roving stations, where the pseudorange correction value(s) available for use in encryption by any roving station are common to all roving stations that communicate with that reference station. (5) The pseudorange correction value(s) used for encryption can be stored sequentially in the reference station and in any roving station for subsequent sender authentication and message encryption/decryption. (6) The degree of encryption used can be made as complex or simple as desired by use of more or fewer of the preceding pseudorange correction values $PRC(t_k;i;j)$. (7) Pseudorange correction values $PRC(t_k;i;j')$ for one satellite $j=j'$ can be used for encryption of a message concerning correction of pseudorange values for another satellite $j=j''$, if desired, or pseudorange correction values $PRC(t_k;i;j)$ and $PRC(t_{k'};i;j')$ for two or more different satellites ($j \neq j'$) can be used to determine the parameters used for encryption and decryption. (8) The encryption/decryption key is dynamic and changes quickly with time, through change of the encryption parameters that depend upon the changing pseudorange correction values $PRC(t_k;i;j)$. Thus, knowledge of the encryption/decryption key $K_n$ for one time interval (e.g., $t_{n-1} < t \leq t_n$) will be of little help in determining the key for subsequent time intervals (e.g., $t_{n'-1} < t \leq t_{n'}$ with $n' \geq n+1$).

Figure 2:
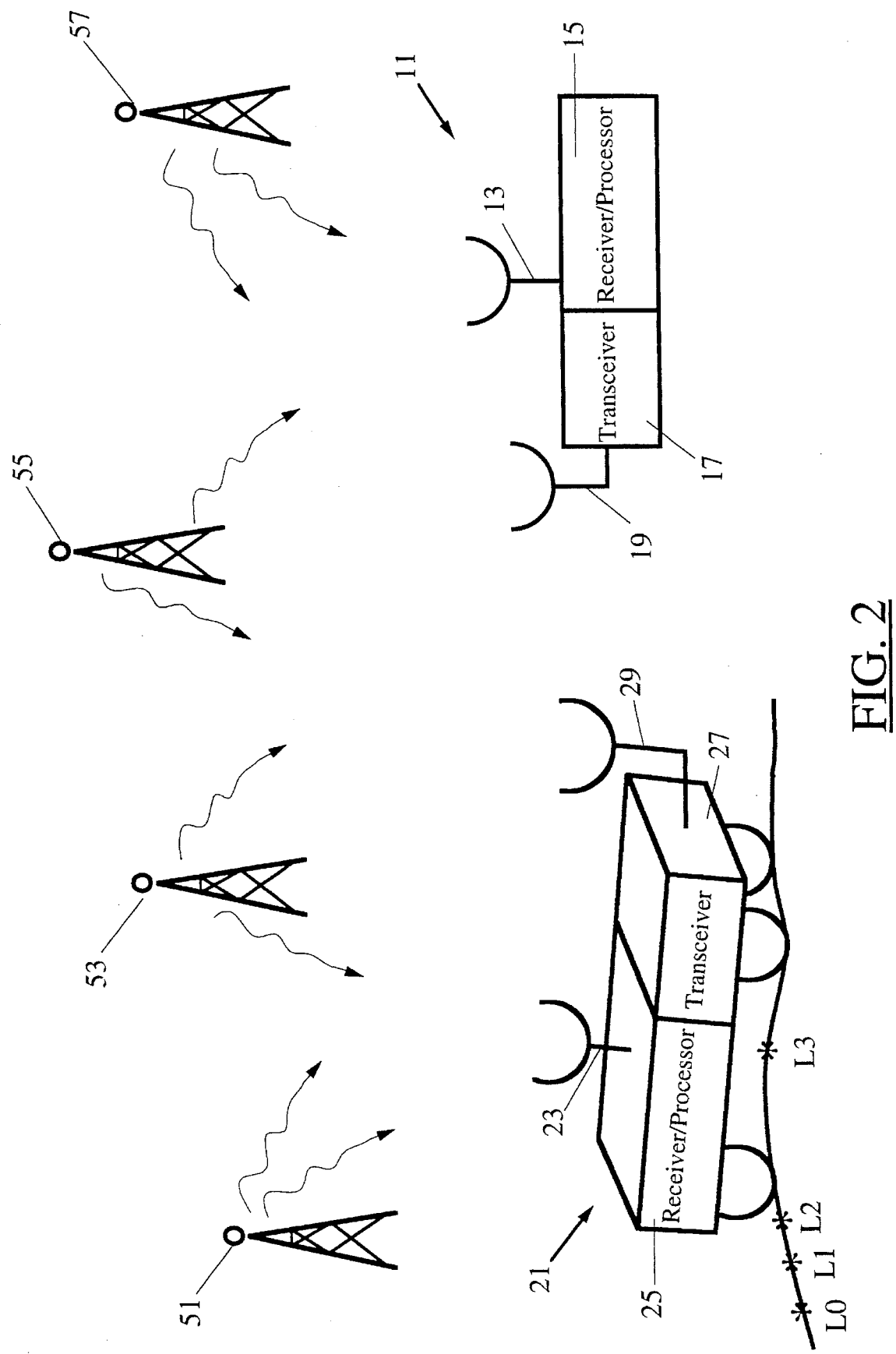

This approach can also be used for transmission of present location information determined by a ground-based LD system, using tower-based sources 51, 53, 55 and 57 as as illustrated in FIG. 2.

Figure 3:
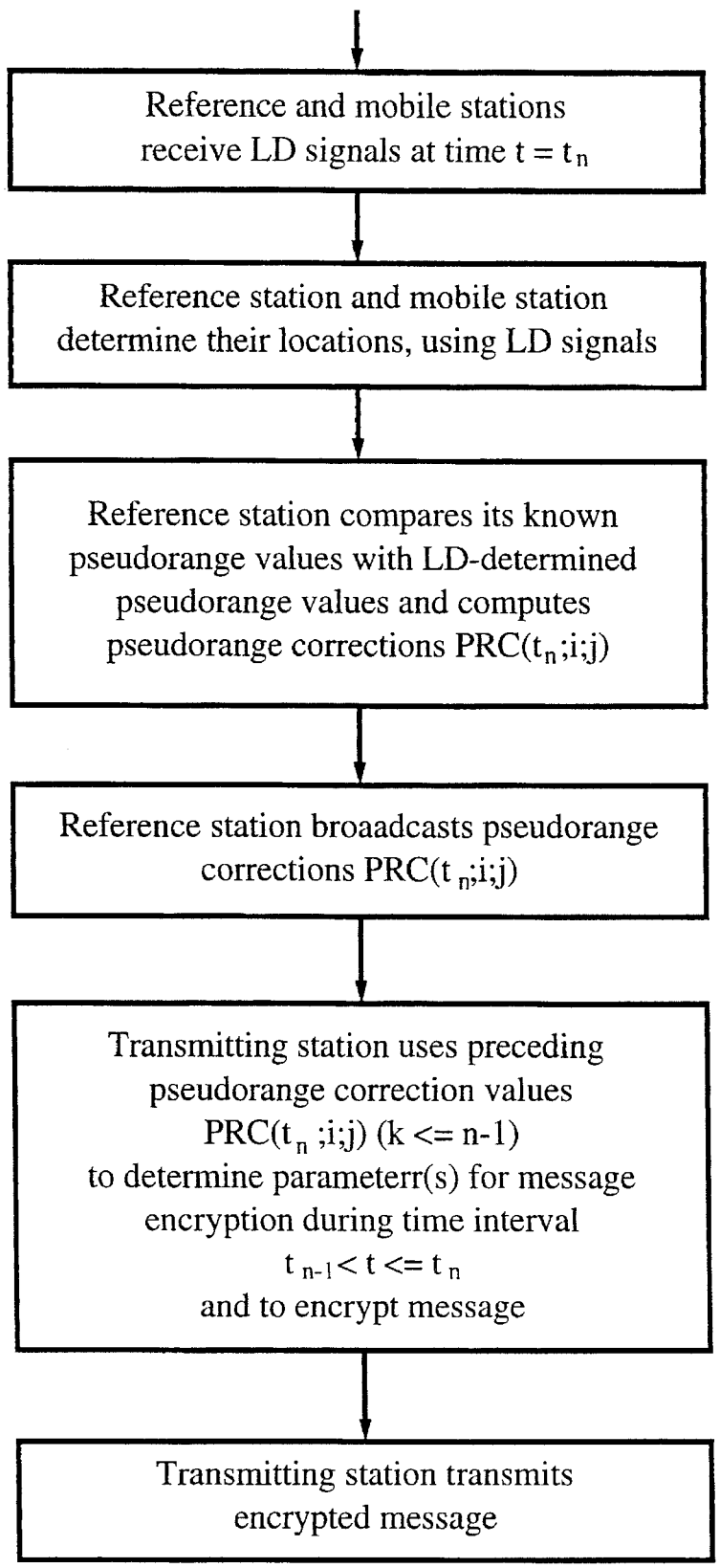
FIG. 3 is a flow chart illustrating a method for practicing the invention.
Figure 4E:
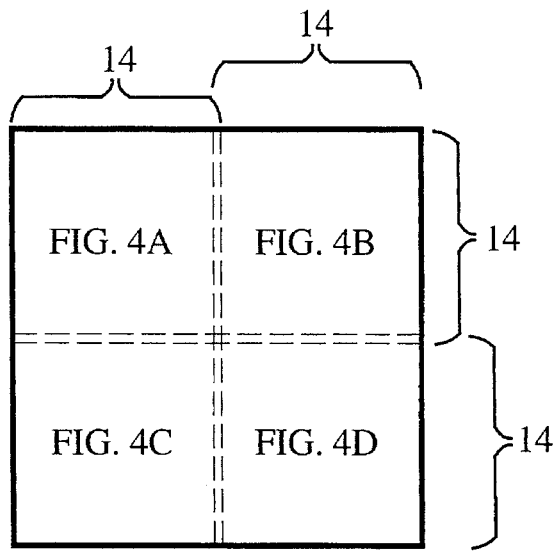
FIGS. 4A–4D, 5A–5D, 6A–6D and 7A–7D (assembled as shown in FIGS. 4E, 5E, 6E and 7E, respectively) show representative matrices that can be used as a key in one embodiment.
Figure 5E:
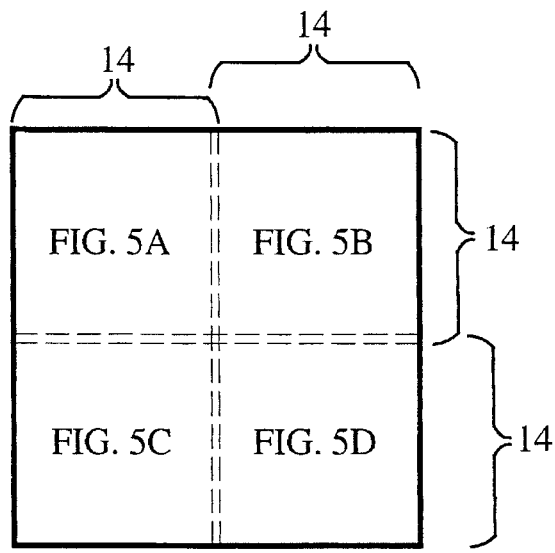
Figure 6E:
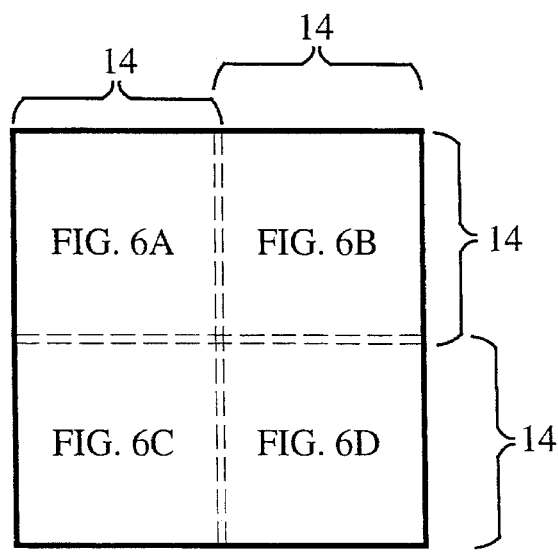
Figure 7E:
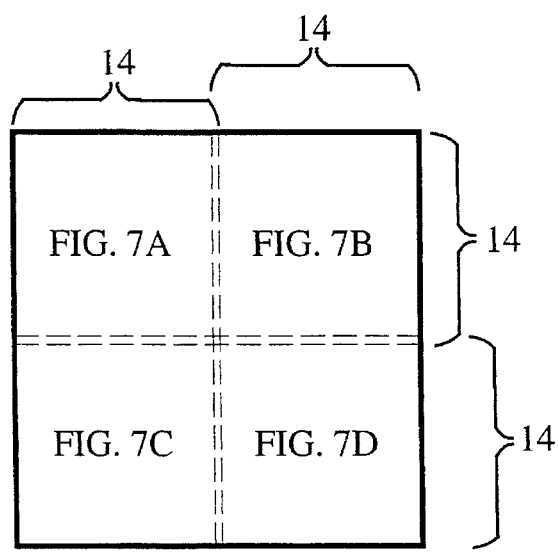

FIG. 3 illustrates, through use of a flow chart, one method for practicing the invention. In step 61, a reference station and one or more nearby mobile stations receive LD signals from a plurality or LD signal sources, which sources may be a plurality of satellites or a plurality or ground-based structures that periodically transmit these LD signals. In step 63, the reference station and the mobile station process the LD signals and determine the present locations of their respective antennas, using pseudorange measurements. In step 65, the reference station compares its pseudorange measurements with the known pseudorange values for the reference station site, based on the known location coordinates of this site, and determines the pseudorange correction $PRC(t;i;j)$ applicable for signals received at time t from LD signal source number j at the LD receiver number i (i=reference station here). The reference station transmits the pseudorange correction signals $PRC(t_k;i;j)$ at a consecutive sequence of times $t=t_0, t_1, \ldots, t_{n-1}, t_n$ in step 67, which correction signals are intended to be received by the mobile station and used to collect the pseudorange measurements made contemporaneously at the mobile station. Each of the reference station and the mobile station optionally stores some or all of the past pseudorange correction signals it has transmitted or received.

In step 69, one or more of the preceding pseudorange signals $PRC(t_k;i;j)$ ($k \leq n-1$) transmitted by the reference station is used to determine one or more parameters in a key used to encrypt and transmit any or all of the following signals: (1) the correction signal $PRC(t_n;i;j)$; and/or (2) a message transmitted by the reference station to a mobile station at a time t in the interval $t_{n-1} < t \leq t_n$ that does not contain a pseudorange correction signal; and/or (3) a message transmitted by a mobile station to the reference station at a time t in the interval $t_{n-1} < t \leq t_n$; and/or (4) a message transmitted by a first mobile station to a second mobile station at a time t in the interval $t_{n-1} < t \leq t_n$. The encryption key KEY(t) at a given time t is determined as in Eq. (1). Each of these messages can be encrypted using an encryption key that contains one or more parameters that depends upon at least one of the "preceding" pseudorange correction values transmitted by the reference station at a preceding time $t=t_0, t_1, \ldots, t_{n-1}$. In step 71, the transmitting station transmits the encrypted message.

The LD system can determine and store a sequence of present location coordinates of a mobile station and can determine the velocity of motion of the station. If the present location of the station is less than a threshold distance, such as 0.5 meter, from the station location at all preceding times within some selected time interval, such as the last 60 seconds, a signal cutoff switch within the LD system can act to suppress transmission of location information by the mobile station until this threshold distance is again exceeded. Alternatively, a signal cutoff switch can suppress transmission of location information if the mobile station velocity falls below, and remains below, a threshold velocity, such as 0.1 meter/sec. Either or both of these features can be used to suppress transmission of encrypted location information and thus make it more difficult for an eavesdropper to accumulate sufficient information to begin to decrypt the encrypted signals.

Assume that the set or universe U(N) of symbols to be encrypted and transmitted has N distinct symbols or characters, and that a first invertible transformation or mapping T1 maps the set or universe U(N) onto the integers $R(N)=\{0, 1, 2, \ldots, N-1\}$. In the (unlikely) event that U(N) contains only integers, the transformation T1 might be the identity mapping or a permutation of the integers in the set R(N). The set of integers in R(N) is mapped by a second invertible transformation or mapping T2 onto U(N). The transformation T2 may, but need not, satisfy the inverse relationship $T2=T1^{-1}$. One or both of the transformations T1 and T2 may also depend non-trivially upon one or more parameters that are determined by the preceding pseudorange values $PRC(t_k;i;j)$ ($k<n$).

As a first example of an association of encryption key parameters, define $$m(k;r1;r2) = \text{concatenated (or selected but non-concatenated)} \quad (3)$$
sequence of $r2-r1+1$ digits (each with a value between 0 and 9 inclusive) in the positions $r1, r1+1, \ldots, r2-1, r2$ in the pseudorange value $PR(t_k;i;j)$, $$s(k;r1;r2) = \text{sum of digits in the sequence } m(k;r1;r2), \quad (4)$$

$$p(k;r1;r2) = \text{product of digits in the sequence} \quad (5)$$
$m(k;r1;r2)$ (mod N), excluding 0, 1 and any non-trivial divisor of N.

The number $u=s*k;r1;r2)$ and/or $v=p(k;r1;r2)$ becomes a parameter in the encryption key. The number of distinct permutations $P_N$ of the N integers in R(N) is N! Many of these permutations $P_N$ are cyclic with a cycle length $L(N)<N$, in the sense that $(P_N)^{L(N)}$ applied to any integer in R(N) is equivalent to the identity transformation I on R(N). Preferably, the cycle length of a permutation $P_N$ used here is $L(N)=N$ so that $(P_N)^Q=I$ requires that Q be a non-zero multiple of N. The encryption procedure, applied to the mth cleartext character or symbol $X_{CLR,m}$ transmitted in the time interval $t_n < t \leq t_{n+1}$, is represented by a ciphertext integer representative defined by $$I_{CYF,m}=(P_N)^{s(n-q;r1;r2)}I_{CLR,m}, \quad (6)$$

or by $$I_{CYF,m}=(P_N)^{p(n-q;r1;r2)}I_{CLR,m}, \quad (7)$$

where q is a positive integer, $$I_{CLR,m}=T1(X_{CLR,m}), \quad (8)$$

$$X_{CYF,m}=T2(I_{CYF,m}) \quad (9)$$

and $X_{CLR,m}$ (m=1, 2, 3, ...) is the mth cleartext character or symbol in the sequence to be encrypted.

As a second example of an association of encryption key parameters, define $$S(k1;k2;r1;r2) = \sum_{k=k1}^{k2} s(k;r1;r2) \pmod{N}, \quad (10)$$

$$P(k1;k2;r1;r2) = \prod_{k=k1}^{k2} p(k;r1;r2) \pmod{N}, \quad (11)$$

where k1 and k2 (>k1) are selected positive integers. The encryption procedure, applied to any cleartext character or symbol $X_{CLR}$ transmitted in the time interval $t_n < t \leq t_{n+1}$, is represented by a ciphertext integer representative defined by $$I_{CYF,m}=(P_N)^{S(n-q1;n-q2;r1;r2)}I_{CLR,m}, \quad (12)$$

or by $$I_{CYF,m}=(P_N)^{P(n-q1;n-q2;r1;r2)}I_{CLR,m}, \quad (13)$$

where q1 and q2 are positive integers with $1 \leq q2 < q1$.

As a third example of an association of encryption key parameters, let $\{K_a\}$ be a sequence of N×N matrices with entries $K_a(b,c)$ (b=row index; c=column index), with each column of entries in a given matrix $K_a$ being a distinct permutation $P_N$ on $R(N)$, relative to other columns in that matrix. Two suitable matrices for such a sequence are shown in FIGS. 4A–4E and 5A–5E for N=27. The matrices $K_a$ in this sequence may be distinct, as in FIGS. 4 and 5, or two or more of the matrices $K_a$ may be identical. Let $\{\psi_m\}_m$ (m=1, 2, . . . ) be a pseudorandom sequence of integers in $R(N)$, defined by a functional relationship such as $$\psi_m = \psi_m(q,r) = f(I_{CLR,m-q}, \psi_{m-r}), \tag{14}$$

where r and s are selected positive integers. One possible choice is q=r=1, but this is not required here. Optionally, the integer $\psi_m$ may depend only upon $I_{CLR,m-q}$ or only upon $\psi_{m-r}$ in Eq. (14). The integers $\psi_m$ for m=0, 1, . . . , MAX=max(q,r)−1 are selected initially using one or more of the pseudorange correction values $PRC(t_k;i;j)$ (k<n), if the character or symbol $X_{CLR,m}$ is being encrypted and transmitted in the time interval $t_n < t \leq t_{n+1}$. For example, the integer values $\psi_0, \psi_1, \ldots \psi_{MAX}$, may be MAX+1 consecutive or non-consecutive selected digits or groups of digits, taken modulo N, in a decimal or similar expression for the pseudorange correction value $PRC(t_s;i;j)$, where s is a selected integer satisfying s<n. Encryption of the mth member of the sequence, $I_{CLR,m} = T1(X_{CLR,m})$, then becomes $$I_{CYF,m} = K_m(I_{CLR,m}, \psi_m). \tag{15}$$

The matrices $K_m$ in Eq. (15) need not possess an inverse. However, an N×N matrix $K_m$ may possess an "inverse" $K_m^*$ in the sense that the relation $$I_{CLR,m} = K_m^*(I_{CYF,m}, \psi_m). \tag{16}$$

is valid whenever Eq. (15) is valid, and conversely. An N×N matrix $K_m$ may have an "inverse" in the sense of Eqs. (15) and (16) if each column of $K_m$ is a permutation of the integers in the set $R(N)$. An equivalent requirement is that each column of $K_m$ be a permutation of the integers in the set $R^+(N) = \{1, 2, \ldots, N\}$, where the integer "0" is identified with the integer "N" in the computations. FIGS. 6A–6E and 7A–7E illustrate a pair of N×N matrices K and K*, with N=27, that are inverses of each other in the sense of Eqs. (15) and (16), where each column of K (and each row of K*) is a permutation of the integers in $R^+(N)$.

In this third example, the preceding pseudorange values are incorporated in the first MAX+1 members of the pseudorandom sequence $\{\psi_m\}$, and these initial MAX+1 members determine the subsequent members of this sequence through Eq. (14). Each member $\psi_m$ of this sequence, together with the cleartext integer representative $I_{CLR,m}$ corresponding to the mth character or symbol in the cleartext message, prescribes a row/column combination in the matrix $K_m$, whose matrix entry $K_m(I_{CLR,m}, \psi_m)$ is the mth integer in the sequence $I_{CYF,m}$. The ciphertext message is then an ordered concatenation of the characters or symbols $\{T2(I_{CYF,m})\}_m$. The ciphertext integer representative $I_{CYF,m}$ depends upon the cleartext integer representative $I_{CLR,m}$, through the first index in the matrix $K_m$ and through Eq. (14), and depends upon one or more pseudorange correction values $PRC(t_k;i;j)$ through the second index $\psi_m$ as this index appears in Eq. (14). The first index and the second index in the definition of the matrix $K_m(I_{CLR,m}, \psi_m)$ can be interchanged here. The first index and/or the second index in the definition of the matrix $K_m(I_{CLR,m}, \psi m)$ can be replaced by an integer-valued function, preferably but not necessarily invertible, of that index value. The effect of a preceding pseudorange correction value or values enters through its effect on the second index in the matrix $K_m$.

In a fourth example, the effect of a preceding pseudorange correction value or values enters through its effect on the first index in the matrix $K_m$. The mth ciphertext integer representative is defined by the relation $$I_{CYF,m} = K_m[(P_N)^{S(n-q1;n-q2;r1;r2)}I_{CLR,m}, I_{CLR,m}], \tag{16}$$

or by $$I_{CYF,m} = K_m[(P_N)^{P(n-q1;n-q2;r1;r2)}I_{CLR,m}, I_{CLR,m}], \tag{17}$$

where $P_N$ is a selected permutation on the integers in $R(N)$, the functions S and P are defined in Eqs. (3), (4), (10) and (11), and r1, r2, q1 and q2 are positive integers that satisfy $1 \leq r1 < r2$ and $1 \leq q1 < q2$.

In a fifth example, the effect of one or more preceding pseudorange correction values enters through its effect on the first transformation T1. The cleartext integer representative $I_{CLR,m}$ is defined by $$I_{CLR,m} = (P_N)^{S(n-q1;n-q2;r1;r2)}T1(X_{CLR,m}), \tag{18}$$

or by $$I_{CLR,m} = (P_N)^{P(n-q1;n-q2;r1;r2)}T1(X_{CLR,m}), \tag{19}$$

where $P_N$ is a selected permutation on the integers in $R(N)$, the functions S and P are defined in Eqs. (3), (4), (10) and (11), and r1, r2, q1 and q2 are positive integers that satisfy $1 \leq r1 < r2$ and $1 \leq q1 < q2$. The encryption of the sequence $\{I_{CLR,m}\}_m$ to form the sequence $\{I_{CYF,m}\}_m$ is carried out in any chosen manner.

In a sixth example, the effect of one or more preceding pseudorange correction values enters through its effect on the first transformation T2. The cleartext integer representative $I_{CLR,m}$ is defined by $$X_{CYF,m} = T2[(P_N)^{S(n-q1;n-q2;r1;r2)}I_{CYF,m}], \tag{20}$$

or by $$X_{CYF,m} = T2[(P_N)^{P(n-q1;n-q2;r1;r2)}I_{CYF,m}], \tag{21}$$

where $P_N$ is a selected permutation on the integers in $R(N)$, the functions S and P are defined in Eqs. (3), (4), (10) and (11), and r1, r2, q1 and q2 are positive integers that satisfy $1 \leq r1 < r2$ and $1 \leq q1 < q2$. Encryption of the sequence $\{I_{CLR,m}\}_m$ to form the sequence $\{I_{CYF,m}\}_m$ is carried out in any chosen manner.

The effect of one or more preceding pseudorange correction values can also be incorporated in two or more of the places among the examples discussed above. More generally, the encryption process can be represented by an ordered sequence of three mappings $$T1(X_{CLR,m}) = I_{CLR,m}, \tag{22}$$

$$I_{CYF,m} = E(I_{CLR,m}), \tag{23}$$

$$X_{CYF,m} = T2(I_{CYF,m}), \tag{24}$$

in which E is an integer encryption procedure that maps a sequence of integers $I_{CLR,m}$ in $R(N)$ into another sequence of integers $I_{CYF,m}$ in R(N). The effect of one or more preceding pseudorange correction values can be incorporated into, and thus vary the effect of, the cleartext transformation T1 and/or the integer encryption procedure E and/or the ciphertext transformation T2. The examples of such incorporation set forth above are merely representative and do not exhaust the possibilities intended to be covered by this disclosure.

The number N may be chosen to be $N \leq 27$, and the universe U(N) may be a proper subset or the full subset of the set of 26 alphabet letters plus the blank space. Alternatively, the number N may be chosen to be $N \leq 256$, and the universe U(N) may be a proper subset or the full subset of the set of 256 characters in an extended ASCII "alphabet", as discussed by W. Tomasi in *Electronic Communications Systems*, Prentice Itall, New York, 1988, pp. 540–544. Any other suitable "alphabet" of characters can also be used.

The preceding discussion has focused on use of a sequence of pseudorange correction signals, issued to correct pseudorange signals, to dynamically change the key or algorithm used to encrypt a message. The invention is generalized by replacing the pseudorange signals by location determination (LD) signals received and analyzed to initially determine the location of the recipient. These LD signals will be different when received at different recipient locations at the same time.

The invention is further generalized by replacing the pseudorange correction signals by (1) any group of location determination adjustment signals used or generated by an LD system, (2) that are associated with adjustment of location based upon LD signals earlier received in an LD system, (3) that change at least moderately often (preferably, at least once every 1–20 seconds), and (4) that are broadcast or otherwise made available for use by any nearby receiver that is part of an LD system. A signal that satisfies the four requirements set forth here will be referred to as a "location determination adjustment signal" or "LDA signal". An LDA signal may be a pseudorange correction signal, as used with Global Positioning Systems (GPSs) and with Loran systems, among others, and may be a carrier phase correction signal, as used with GPSs, or any other qualifying signal.

The signal received and used to determine the (changing) encryption key or algorithm is preferably a time-varying, non-predictable signal that can be received by any nearby receiver, much as a "public key" in a public key encryption scheme, such as the RSA scheme discussed earlier, is available to many persons or systems. However, an LDA signal will vary with time in a non-predictable manner and thus behaves as a time-varying public key. The "private key" portion of this encryption scheme includes knowledge of: (1) which portions of an LDA signal are to be used; (2) how these portions are to be used to dynamically vary one or more parameters in an encryption key or algorithm; and (3) what is the remainder of the encryption key or algorithm. Only a signal recipient who knows all three components of this "private key" will be able to encrypt or decrypt messages according to these approaches.

Based upon an estimated maximum location drift of about 1 cm/sec/sec and a choice of maximum allowable errors for GPS pseudorange and GPS carrier phase of 1 meter and 1 mm, respectively, a pseudorange correction signal and a carrier phase correction signal would be broadcast at least once every 14.1 sec and at least once every 0.45 sec, respectively, for a given GPS signal source. Thus, pseudorange correction signals and/or carrier phase correction signals will be received from an LDA signal source often enough to provide a dynamically varying encryption key or algorithm for encryption of messages transmitted between receivers in an LD system.

Methods for decryption of a messages that has been encrypted according to the approaches set forth here are discussed in a companion patent application, "A Variable Encryption Procedure", U.S. Ser. No. 08/367,784, filed on the same day this application was filed and assigned to the same assignee.

Possible applications of these procedures include: encryption of location or navigation information, arising from surveying or geological or mineralogical prospecting activities, to be transmitted from the field to a central data storage or data processing location; encryption of sensitive business data to be transmitted from one site to another using ordinary transmission means or using a public messaging network; and authentication or validation of messages received a source whose authenticity cannot be confirmed directly. For example, if a sequence $(x_n, y_n, z_n, t_n)$ of spatial location and temporal coordinates, or corrections to such coordinates, is determined by a location determination (LD) system, such as GPS, GLONASS, Loran, Decca, Tacan, Omega, JTIDS Relnav or PLRS, this sequence can be transmitted in encrypted form to an authorized user thereof, using the above encryption approaches. Transmission of encrypted data will make it difficult for any eavesdropper to obtain and decipher such data in a reasonable period of time.

These encryption procedures can also be used to authenticate or validate the source of information transmitted by, and received from, an information source that may be legitimate. The legitimate information source can include in its transmitted message a supplemental message that is encrypted and is interwoven with the standard message. Alternatively, the entire transmitted message can be encrypted using these procedures. A nonlegitimate information source will have no access to the encryption key, will not know which bits or bytes in a transmitted message are to be replaced or displaced by portions of an encrypted message, and will not know what the encrypted message is to be. Further, the encryption key may vary with time or may be determined in part by the preceding sequence of encrypted characters.

We claim:

1. A method for secure electromagnetic communication of location correction information between two Location Determination System stations, or "LDS stations", the method comprising the steps of:

providing an LDS reference station, having location coordinates that are known with high accuracy, the reference station having an LDS signal antenna and associated LDS signal receiver/processor for receiving and processing location determination signals, or "LD signals", from a plurality of LD signal sources to determine spatial location and clock coordinates for that station;

providing an LDS mobile station, having an LDS signal antenna and associated LDS signal receiver/processor for receiving and processing LD signals from a plurality of LD signal sources to determine spatial location and clock coordinates for that station;

causing each of the reference station and the mobile station to receive LD signals from a plurality of LD signal sources, numbered j=1, 2, ... M[(M≧2)], with M≧2, in common view with each other, and to determine the LD signal values LD(t;i;j) as a function of time t for that station, numbered i=reference and i=mobile, from the signals received from the M common view LD signal sources;

causing the reference station to determine location determination adjustment signal values, or "LDA signal values", LDA(t;ref;j) at one or more times t that, when added to the LD signal values LD(t;ref;j) available at the reference station for the time t, produce spatial location coordinates that approximately agree with the known spatial location coordinates for the reference station for the time t; and providing the LDA signal values LDA(t;ref;j) in an encrypted form for the mobile station for a sequence of at least two consecutive times $t=t_1, t_2, \ldots, t_n, t_{n+1}, \ldots$ so that the mobile station can correct its mobile station measured LD signal values, LD(t;mob;j), where this encrypted form of an LDA signal LDA($t_n$;ref;j) for at least one of this sequence of times $t_n$ ($n \geq 1$) uses an encryption key $K_n$ that has at least one parameter that depends non-trivially upon at least one of the preceding LDA signal values, LDA($t_1$;ref;j) ..., and LDA($t_{n-1}$;ref;j), provided by the reference station, and where at least two encryption keys, $K_{n1}$ and $K_{n2}$, for different times $t_n=t_{n1}$ and $t_n=t_{n2}$ differ from each other.

2. The method of claim 1, further comprising the step of selecting said LDA signals from a class of such signals consisting of pseudorange correction signals and carrier phase correction signals.

3. The method of claim 1, further comprising the steps of:

causing said mobile station to use said encryption key $K_n$ to attempt to decrypt said encrypted form of said LDA signals received by the mobile station for said time $t=t_n$, and to determine whether said LDA signals received for said time $t=t_n$ were encrypted using said encryption key $K_n$;

when said LDA signals received by the mobile station for said time $t=t_n$ are determined to have been encrypted using said encryption key $K_n$, causing said mobile station to form corrected LD signal values CLD($t_n$;mob;j)=LD($t_n$;mob;j)+LDA($t_n$;ref;j), to replace said LD signal value LD($t_n$;mob;j) by this corrected LD signal value for j=1, ..., M, and to compute a corrected mobile station location for said time $t=t_n$ using the corrected LD signal values; and when said LDA signals received by the mobile station for the time $t=t_n$ are determined not to have been encrypted using said encryption key $K_n$, causing said mobile station to reject or ignore said LDA signals for said time $t=t_n$.

4. A method for secure electromagnetic communication of information between two Location Determination System stations, or "LDS stations", the method comprising the steps of:

providing an LDS reference station, having location coordinates that are known with high accuracy, the reference station having an LDS signal antenna and associated LDS signal receiver/processor for receiving and processing location determination signals, or "LD signals", from a plurality of LD signal sources to determine spatial location and clock coordinates for that station;

providing an LDS mobile station, having an LDS signal antenna and associated LDS signal receiver/processor for receiving and processing LD signals from a plurality of LD signal sources to determine spatial location and clock coordinates for that station;

causing each of the reference station and the mobile station to receive LD signals from a plurality of LDS satellites, numbered j=1, 2, ..., M, with M≧2, in common view with each other, and to determine the LD signal values LD(t;i;j) as a function of time t for that station, numbered i (i=reference and i=mobile), from the signals received from the M common view LDS signal sources;

causing the reference station to determine location determination adjustment signal values, or "LDA signal values," LDA(t;ref;j) at one or more times t that, when added to the LD signal values LD(t;ref;j) available at the reference station for the time t, produce spatial location coordinates that approximately agree with the known spatial location coordinates for the reference station for the time t;

providing the LDA signals LDA(t;ref;j) for the mobile station for a sequence of at least two consecutive times $t=t_1, t_2, \ldots, t_n, t_{n+1}, \ldots$ so that the mobile station can correct its mobile station measured LD signal values; and for times t in at least one time interval $t_n < t \leq t_{n+1}$, causing the reference station to encrypt a message to produce an encrypted message $M_n$ and to transmit the message $M_n$ from the reference station to the mobile station, where this encrypted message uses an encryption key $K_n$ that has at least one parameter that depends upon at least one of the preceding LDA signal values, LDA($t_1$;ref;j), ..., LDA($t_{n-1}$;ref;j), provided by the reference station, and where at least two encryption keys $K_{n1}$ and $K_{n2}$ for different times $t_n=t_{n1}$ and $t_n=t_{n2}$ differ from each other.

5. The method of claim 4, further comprising the step of selecting said LDA signals from a class of such signals consisting of pseudorange correction signals and carrier phase correction signals.

6. The method of claim 4, further comprising the steps of:

causing said mobile station to use said encryption key $K_n$ to attempt to decrypt a message $M'_n$ received by said mobile station for said time $t=t_n$, and to determine whether the encrypted message $M'_n$ received for said time $t=t_n$ was encrypted using said encryption key $K_n$;

when the message $M'_n$ received by said mobile station for said time $t=t_n$ is determined to have been encrypted using said encryption key $K_n$, causing said mobile station to accept a decrypted version of the message $M'_n$ as received from said reference station; and when the message $M'_n$ received by said mobile station for said time $t=t_n$ is determined not to have been encrypted using said encryption key $K_n$, causing said mobile station to treat the message $M'_n$ as not received from said reference station.

7. The method of claim 4, wherein said step of causing said reference station to encrypt a message comprises the steps of:

providing a universe U(N) having N distinct characters from which the cleartext message is drawn;

providing an invertible transformation T1 of the set U(N) of characters onto a set of integers R(N)={0, 1, 2, ..., N−1}, where the mth character, $X_{CLR,m}$, of the cleartext message is transformed into an mth cleartext integer representative, $I_{CLR,m}=T1(X_{CLR,m})$, by the transformation T1;

providing an encryption transformation E of the set R(N) into R(N) that receives the cleartext integer representative, $I_{CLR,m}$, and produces a ciphertext integer representative, $I_{CYF,m}=E(I_{CLR,m})$; and providing an invertible transformation T2 of the set R(N) onto the universe U(N) of characters, where the mth character of the ciphertext message, $X_{CYF,m}$, is the image under the transformation T2 of an mth integer, $I_{CYF,m}$;

where, for at least two time intervals given by $t_n < t \leq t_{n+1}$, for $n=n1$ and $n=n2$ with $a \leq n1 < n2$, at least one of the transformations T1, E and T2 has a parameter that depends upon at least one of said preceding LDA signal values, $LDA(t_0;ref;j), \ldots LDA(t_{n-1};ref;j)$, provided by said reference station.

8. The method of claim 7, further comprising the step of selecting said transformation T1 so that T1 depends non-trivially upon at least one of said preceding LDA signal values $LDA(t_k;ref;j)$ with $k<n$.

9. The method of claim 8, further comprising the step of selecting said transformation T1 to be of the form $$\begin{aligned} I_{CLR,m} &= T1(X_{CLR,m}) = \\ &= (P_N)^{S(n-q1;n-q2;r1;r2)} T1'(X_{CLR,m}), \end{aligned}$$

where $P_N$ is a selected permutation on said set R(N), T1' is a second selected transformation from said set U(N) onto said set R(N), and $S(n-q1;n-q2;r1;r2)$ is an integer defined by $$S(k1;k2;r1;r2) = \sum_{k=k1}^{k2} s(k;r1;r2) \pmod{N},$$

$s(k;r1;r2)$=sum of digits in the sequence $m(k;r1;r2)$ (mod N), $m(k;r1;r2)$=selected sequence of $r2-r1+1$ digits, each having a value between 0 and 9 inclusive, in the digit positions $r1, r1+1, \ldots, r2-1, r2$ in a selected LDA signal value $LDA(t_{k'};ref;j)$ with $k'<n$, where q1, q2, r1 and r2 are positive integers satisfying $1 \leq q1 < q2$ and $1 \leq r1 < r2$.

10. The method of claim 8, further comprising the step of selecting said transformation T1 to be of the form $$\begin{aligned} I_{CLR,m} &= T1(X_{CLR,m}) = \\ &= (P_N)^{P(n-q1;n-q2;r1;r2)} T1'(X_{CLR,m}), \end{aligned}$$

where $P_N$ is a selected permutation on said set R(N), T1' is a second selected transformation from said set U(N) onto said set R(N), and P is an integer defined by $$P(k1;k2;r1;r2) = \prod_{k=k1}^{k2} s(k;r1;r2) \pmod{N},$$

$p(k;r1;r2)$=product of digits in the sequence $m(k;r1;r2)$ (mod N), excluding 0, 1 and any non-trivial integer divisor of N, $m(k;r1;r2)$=selected sequence of $r2-r1+1$ digits, each having a value between 0 and 9 inclusively, in the digit positions $r1, r1+1, \ldots, r2-1, r2$ in a selected LDA signal value $LDA(t_{k'};ref;j)$ with $k'<n$, where q1, q2, r1 and r2 are positive integers satisfying $1 \leq q1 < q2$ and $1 \leq r1 < r2$.

11. The method of claim 7, further comprising the step of selecting said transformation T2 so that T2 depends non-trivially upon at least one of said preceding LDA signal values $LDA(t_k;ref;j)$ with $k<n$.

12. The method of claim 11, further comprising the step of selecting said transformation T2 to be of the form $$\begin{aligned} X_{CYF,m} &= T2(I_{CYF,m}) = \\ &= T2'[(P_N)^{S(n-q1;n-q2;r1;r2)} I_{CLR,m}], \end{aligned}$$

where $P_N$ is a selected permutation on said set R(N), T2' is a second selected transformation from said set R(N) onto said set U(N), and $S(n-q1;n-q2;r1;r2)$ is an integer defined by $$S(k1;k2;r1;r2) = \sum_{k=k1}^{k2} s(k;r1;r2) \pmod{N},$$

$s(k;r1;r2)$=sum of digits in the sequence $m(k;r1;r2)$ (mod N), $n(k;r1;r2)$=selected sequence of $r2-r1+1$ digits, each having a value between 0 and 9 inclusive, in the digit positions $r1, r1+1, \ldots, r2-1, r2$ in a selected LDA signal value $LDA(t_{k'};ref;j)$ with $k'<n$, where q1, q2, r1 and r2 are positive integers satisfying $1 \leq q1 < q2$ and $1 \leq r1 < r2$.

13. The method of claim 11, further comprising the step of selecting said transformation T2 to be of the form $$\begin{aligned} X_{CYF,m} &= T2(I_{CYF,m}) = \\ &= T2'[(P_N)^{P(n-q1;n-q2;r1;r2)} I_{CLR,m}], \end{aligned}$$

where $P_N$ is a selected permutation on said set R(N), T2' is a second selected transformation from said set R(N) onto said set U(N), and $P(n-q1;n-q2;r1;r2)$ is an integer defined by $$P(k1;k2;r1;r2) = \prod_{k=k1}^{k2} s(k;r1;r2) \pmod{N},$$

$p(k;r1;r2)$=product of digits in the sequence $m(k;r1;r2)$ (mod N), excluding 0, 1 and any non-trivial integer divisor of N, $m(k;r1;r2)$=selected sequence of $r2-r1+1$ digits, each having a value between 0 and 9 inclusive, in the digit positions $r1, r1+1, \ldots r2-1, r2$ in a selected LDA signal value $LDA(t_{k'};ref;j)$ with $k'<n$, where q1, q2, r1 and r2 are positive integers satisfying $1 \leq q1 < q2$ and $1 < r1 < r2$.

14. The method of claim 7, further comprising the step of selecting said encryption transformation E so that E depends non-trivially upon at least one of said preceding LDA signal values $LDA(t_k;ref;j$ with $k<n$.

15. The method of claim 14, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical;

providing a sequence $\{\psi_m\}_m$ of integers in R(N), with $m=1,2,\ldots$, defined by a functional relationship $\psi_m = \psi_m(q,r) = f(I_{CLR,m-q}, \psi_{m-r})$, where r and s are selected positive integers, for $m \geq MAX = \max(q,r)-1$, and providing a set of initial values, $\psi_0, \psi_1, \ldots, \psi_{MAX}$, lying in said set R(N), for this sequence, where at least one of this set of initial values depends non-trivially upon at least one of said preceding LDA signal values $LDA(t_k;ref;j$ with $k<n$; and for at least one integer $m \geq MAX$, defining said mth cleartext integer representative $I_{CYF,m}$ by the relation $I_{CYF,m} = K_m(I_{CLR,m}, \psi_m)$.

16. The method of claim 14, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical;

providing a sequence $\{\psi_m\}_m$ of integers in R(N), with $m=1, 2, \ldots$, defined by a functional relationship $\psi_m = \psi_m(q,r) = f(I_{CLR,m-q}, \psi_{m-r})$, where r and s are selected positive integers, for $m \geq MAX = \max(q,r) - 1$, and providing a set of initial values, $\psi_0, \psi_1, \ldots \psi_{MAX}$, lying in said set R(N), for this sequence, where at least one of this set of initial values depends non-trivially upon at least one of said preceding LDA signal values $LDA(t_k; \text{ref}; j)$ with k<n; and for at least one integer $m \geq MAX$, defining said mth cleartext integer representative $I_{CYF,m}$ by the relation
$I_{CYF,m} = K_m(\psi_m, I_{CLR,m})$.

17. The method of claim 14, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer $m \geq 1$, defining said mth cleartext integer representative $I_{CYF,m}$ by the relation
$I_{CYF,m} = K_m(I_{CLR,m}, (P_N)^{S(n-q1;n-q2;r1;r2)} I_{CLR,m})$,
where PN is a selected permutation on said set R(N), and $S(n-q1;n-q2;r1;r2)$ is an integer defined by $$S(k1;k2;r1;r2) = \sum_{k=k1}^{k2} s(k;r1;r2) \pmod{N},$$

$s(k;r1;r2)$=sum of digits in the sequence $m(k;r1;r2)$ (mod N), $m(k;r1;r2)$=selected sequence of $r2-r1+1$ digits, each having a value between 0 and 9 inclusive, in the digit positions r1, r1+1, ..., r2-1, r2 in a selected LDA signal value $LDA(t_{k'};\text{ref};j)$ with k'<n, where q1, q2, r1 and r2 are positive integers satisfying $1 \leq q1 < q2$ and $1 \leq r1 < r2$.

18. The method of claim 14, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer $m \geq 1$, defining said mth cleartext integer representative $I_{CYF,m}$ by the relation
$I_{CYF,m} = K_m(I_{CLR,m}, (P_N)^{P(n-q1;n-q2;r1;r2)} I_{CLR,m})$,
where $P_N$ is a selected permutation on said set R(N), and $P(n-q1;n-q2;r1;r2)$ is an integer defined by $$P(k1;k2;r1;r2) = \prod_{k=k1}^{k2} s(k;r1;r2) \pmod{N},$$

$p(k;r1;r2)$=product of digits in the sequence $m(k;r1;r2)$ (mod N), excluding 0, 1 and any non-trivial integer divisor of N, $m(k;r1;r2)$=selected sequence of $r2-r1+1$ digits, each having a value between 0 and 9 inclusive, in the digit positions r1, r1+1, ..., r2-1, r2 in a selected LDA signal value $LDA(t_{k'};\text{ref};j)$ with k'<n, where q1, q2, r1 and r2 are positive integers satisfying $1 < q1 < q2$ and $1 \leq r1 < r2$.

19. The method of claim 14, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer $m \geq 1$, defining said mth cleartext integer representative $I_{CYF,m}$ by the relation
$I_{CYF,m} = K_m((P_N)^{S(n-q1;n-q2;r1;r2)} I_{CLR,m}, I_{CLR,m})$
where $P_N$ is a selected permutation on said set R(N), and $S(n-q1;n-q2;r1;r2)$ is an integer defined by $$S(k1;k2;r1;r2) = \sum_{k=k1}^{k2} s(k;r1;r2) \pmod{N},$$

$s(k;r1;r2)$=sum of digits in the sequence $m(k;r1;r2)$ (mod N), $m(k;r1;r2)$=selected sequence of $r2-r1+1$ digits, each having a value between 0 and 9 inclusive, in the digit positions r1, r1+1, ..., r2-1, r2 in a selected LDA signal value $LDA(t_{k'};\text{ref};j)$ with k'<n, where q1, q2, r1 and r2 are positive integers satisfying $1 \leq q1 < q2$ and $1 \leq r1 < r2$.

20. The method of claim 14, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer $m \geq 1$, defining said mth cleartext integer representative $I_{CYF,m}$ by the relation
$I_{CYF,m} = K_m((P_N)^{P(n-q1;n-q2;r1;r2)} I_{CLR,m}, I_{CLR,m})$
where $P_N$ is a selected permutation on said set R(N), and $P(n-q1;n-q2;r1;r2)$ is an integer defined by $$P(k1;k2;r1;r2) = \prod_{k=k1}^{k2} s(k;r1;r2) \pmod{N},$$

$p(k;r1;r2)$=product of digits in the sequence $m(k;r1;r2)$ (mod N), excluding 0, 1 and any non-trivial integer divisor of N.

$m(k;r1;r2)$=selected sequence of $r2-r1+1$ digits, each having a value between 0 and 9 inclusive, in the digit positions r1, r1+1, ..., r2-1, r2 in a selected LDA signal value $LDA(t_{k'};\text{ref};j)$ with k'<n, where q1, q2, r1 and r2 are positive integers satisfying $1 \leq q1 < q2$ and $1 \leq r1 < r2$.

21. A method for secure electromagnetic communication of information between two Location Determination System stations, or "LDS stations," the method comprising the steps of:

providing an LDS reference station, having location coordinates that are known with high accuracy, the reference station having an LDS signal antenna and associated LDS signal receiver/processor for receiving and processing location determination signals, or "LD signals," from a plurality of LD signal sources to determine spatial location and clock coordinates for that station;

providing an LDS mobile station, having an LDS signal antenna and associated LDS signal receiver/processor for receiving and processing LD signals from a plurality of LD signal sources to determine spatial location and clock coordinates for that station;

causing each of the reference station and the mobile station to receive LD signals from a plurality of LDS satellites, numbered j=1, 2, . . . , M, with M≧2, in common view with each other, and to determine the LD signal values LD(t;i;j) as a function of time t for that station, numbered i=reference and i=mobile, from the signals received from the M common view LDS signal sources;

causing the reference station to determine location determination adjustment (LDA) signal values LDA(t;ref;j) at one or more times t that, when added to the LD signal values LD(t;ref;j) available at the reference station for the time t, produce spatial location coordinates that approximately agree with the known spatial location coordinates for the reference station at the time t;

providing the LDA signals LDA(t;ref;j) for the mobile station and for a selected message recipient that is spaced apart from the mobile station, at a sequence of at least two consecutive times t=$t_1, t_2, \ldots, t_n, t_{n+1}, \ldots$ so that the mobile station can correct its measured LD signal values; and for times t in at least one time interval $t_n < t \leq t_{n+1}$, causing the mobile station to encrypt a message to produce an encrypted message $M_n$ and to transmit the message $M_n$ from the mobile station to the selected recipient, where this encrypted message $M_n$ uses an encryption key $K_n$ that has at least one parameter that depends non-trivially upon at least one of the preceding LDA signal values, LDA($t_1$;i;j), . . . , LDA($t_{n-1}$;i;j), provided by the reference station, and where at least two encryption keys $K_{n1}$ and $K_{n2}$ for different times $t_n = t_{n1}$ and $t_n = t_{n2}$ differ from each other.

22. The method of claim 21, further comprising the step of selecting said LDA signals from a class of such signals consisting of pseudorange correction signals and carrier phase correction signals.

23. The method of claim 21, further comprising the steps of:

causing said selected recipient to use said encryption key $K_n$ to attempt to decrypt a message $M'_n$ received by said selected recipient for said time $t = t_n$, and to determine whether the encrypted message $M'_n$ received for said time $t = t_n$ was encrypted using said encryption key $K_n$;

when the message $M'_n$ received by said selected recipient for said time $t = t_n$ is determined to have been encrypted using said encryption key $K_n$, causing said selected recipient to accept a decrypted version of the message $M'_n$ as received from said mobile station; and when the message $M'_n$ received by said selected recipient for said time $t = t_n$ is determined not to have been encrypted using said encryption key $K_n$, causing said selected recipient to treat the message $M'_n$. as not received from said mobile station.

24. The method of claim 21, further comprising the step of selecting said reference station as said recipient of said encrypted message.

25. The method of claim 21, further comprising the step of selecting a second selected LDS mobile station that is spaced apart from said mobile station as said recipient of said encrypted message.

26. The method of claim 21, wherein said step of causing said reference station to encrypt a message comprises the steps of:

providing a universe U(N) having N distinct characters from which the cleartext message is drawn;

providing an invertible transformation T1 of the set U(N) of characters onto a set of integers R(N)={0, 1, 2, . . . , N–1 }, where the mth character, $X_{CLR,m}$, of the cleartext message is transformed into an mth cleartext integer representative, $I_{CLR,m}$=T1 ($X_{CLR,m}$), by the transformation T1;

providing an encryption transformation E of the set R(N) into R(N) that receives the cleartext integer representative, $I_{CLR,m}$, and produces a ciphertext integer representative, $I_{CYF,m}$=E($I_{CLR,m}$); and providing an invertible transformation T2 of the set R(N) onto the universe U(N) of characters, where the mth character of the ciphertext message, $X_{CYF,m}$, is the image under the transformation T2 of an mth integer, $I_{CYF,m}$;

where, for at least two time intervals given by $t_n < t \leq t_{n+1}$ with n=n1 and n=n2, at least one of the transformations T1, E and T2 has a parameter that depends non-trivially upon at least one of said preceding LDA signal values, LDA($t_0$;i;j), . . . , and LDA($t_{n-1}$;i;j), provided by said reference station.

27. The method of claim 26, further comprising the step of selecting said transformation T1 so that T1 depends non-trivially upon at least one of said preceding LDA signal values LDA($t_{k'}$;ref;j) with k'<n.

28. The method of claim 27, further comprising the step of selecting said transformation T1 to be of the form $$I_{CLR,m} = T1(X_{CLR,m}) =$$
$$= (P_N)^{S(n-q1;n-q2;r1;r2)} T1'(X_{CLR,m}),$$

where $P_N$ is a selected permutation on said set R(N), T1' is a second selected transformation from said set U(N) onto said set R(N), and S(n–q1;n–q2;r1;r2) is an integer defined by $$S(k1;k2;r1;r2) = \sum_{k=k1}^{k2} s(k;r1;r2) \pmod{N},$$

s(k;r1;r2)=sum of digits in the sequence m(k;r1;r2) (mod N), m(k;r1;r2)=selected sequence of r2–r1+1 digits, each having a value between 0 and 9 inclusive, in the digit positions r1, r1+1, . . . , r2–1, r2 in a selected LDA signal value LDA($t_{k'}$;ref;j) with k'<n, where q1, q2, r1 and r2 are positive integers satisfying 1≦q1<q2 and 1≦r1<r2.

29. The method of claim 27, further comprising the step of selecting said transformation T1 to be of the form $$I_{CLR,m} = T1(X_{CLR,m}) =$$
$$= (P_N)^{P(n-q1;n-q2;r1;r2)} T1'(X_{CLR,m}),$$

where $P_N$ is a selected permutation on said set R(N), T1' is a second selected transformation from said set U(N) onto said set R(N), and P(n–q1;n–q2;r1;r2) is an integer defined by $$P(k1;k2;r1;r2) = \prod_{k=k1}^{k2} s(k;r1;r2) \pmod{N},$$

p(k;r1;r2)=product of digits in the sequence m(k;r1;r2) (mod N), excluding 0, 1 and any non-trivial integer divisor of N, m(k;r1;r2)=selected sequence of r2−r1+1 digits, each having a value between 0 and 9 inclusive, in the digit positions r1, r1+1, ..., r2−1, r2 in a selected LDA signal value LDA($t_{k'}$;ref;j) with k'<n, where q1, q2, r1 and r2 are positive integers satisfying $1 \leq q1 < q2$ and $1 \leq r1 < r2$.

30. The method of claim 26, further comprising the step of selecting said transformation T2 so that T2 depends non-trivially upon at least one of said preceding LDA signal values LDA($t_{k'}$;ref;j) with k'<n.

31. The method of claim 30, further comprising the step of selecting said transformation T2 to be of the form $$X_{CYF,m} = T2(I_{CYF,m}) =$$
$$= T2'\{(P_N)^{P(n-q1;n-q2;r1;r2)}I_{CLR,m}\},$$

where $P_N$ is a selected permutation on said set R(N), T2' is a second selected transformation frown said set R(N) onto said set U(N), and S(n−q1;n−q2;r1;r2) is an integer defined by $$S(k1;k2;r1;r2) = \sum_{k=k1}^{k2} s(k;r1;r2) \pmod{N},$$

s(k;r1;r2)=sum of digits in the sequence m(k;r1;r2) (mod N), m(k;r1;r2)=selected sequence of r2−r1+1 digits, each having a value between 0 and 9 inclusive, in the digit positions r1, r1+1, ..., r2−1, r2 in a selected LDA signal value LDA($t_{k'}$;ref;j) with k'<n, where q1, q2, r1 and r2 are positive integers satisfying $1 \leq q1 < q2$ and $1 \leq r1 < r2$.

32. The method of claim 30, further comprising the step of selecting said transformation T2 to be of the form $$X_{CYF,m} = T2(I_{CYF,m}) =$$
$$= T2'[(P_N)^{P(n-q1;n-q2;r1;r2)}I_{CLR,m}],$$

where $P_N$ is a selected permutation on said set R(N), T2' is a second selected transformation from said set R(N) onto said set U(N), and P(n−q1;n−q2;r1;r2) is an integer defined by $$P(k1;k2;r1;r2) = \prod_{k=k1}^{k2} s(k;r1;r2) \pmod{N},$$

p(k;r1;r2)=product of digits in the sequence m(k;r1;r2) (mod N), excluding 0, 1 and any non-trivial integer divisor of N, m(k;r1;r2)=selected sequence of r2−r1+1 digits, each having a value between 0 and 9 inclusive, in the digit positions r1, r1+1, ..., r2−1, r2 in a selected LDA signal value LDA($t_{k'}$;ref;j with k'<n, where q1, q2, r1 and r2 are positive integers satisfying $1 \leq q1 < q2$ and $1 \leq r1 < r2$.

33. The method of claim 26, further comprising the step of selecting said encryption transformation E so that E depends non-trivially upon at least one of said preceding LDA signal values LDA($t_{k'}$;ref;j) with k'<n.

34. The method of claim 33, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical;

providing a sequence $\{\psi_m\}_m$ of integers in R(N), with m=1, 2, ..., defined by a functional relationship $\psi_m = \psi_m(q,r) = f(I_{CLR,m-q}, \psi_{m-r})$, where r and s are selected positive integers, for m≥MAX=max(q,r)−1, and providing a set of initial values, $\psi_0, \psi_1, ..., \psi_{MAX}$, lying in said set R(N), for this sequence, where at least one of this set of initial values depends non-trivially upon at least one of said preceding LDA signal values LDA($t_{k'}$;ref;j) with k'<n; and for at least one integer m≥MAX, defining said mth cleartext integer representative $I_{CYF,m}$ by the relation $I_{CYF,m} = K_m(I_{CLR,m}, \psi_m)$.

35. The method of claim 33, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical;

providing a sequence $\{\psi_m\}_m$ of integers in R(N), with m=1, 2, ..., defined by a functional relationship $\psi_m = \psi_m(q,r) = f(I_{CLR,m-q}, \psi_{m-r})$, where r and s are selected positive integers, for m≥MAX=max(q,r)−1, and providing a set of initial values, $\psi_0, \psi_1, ..., \psi_{MAX}$, lying in said set R(N), for this sequence, where at least one of this set of initial values depends non-trivially upon at least one of said preceding LDA signal values LDA($t_{k'}$;ref;j) with k'<n; and for at least one integer m≥MAX, defining said mth cleartext integer representative $I_{CYF,m}$ by the relation $I_{CYF,m} = K_m n(\psi_m, I_{CLR,m})$.

36. The method of claim 33, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer m≥1, defining said mth cleartext integer representative $I_{CYF,m}$ by the relation $I_{CYF,m} = K_m(I_{CLR,m}, (P_N)^{S(n-q1;n-q2;r1;r2)}I_{CLR,m})$, where $P_N$ is a selected permutation on said set R(N), and S(n−q1;n−q2;r1;r2) is an integer defined by $$S(k1;k2;r1;r2) = \sum_{k=k1}^{k2} s(k;r1;r2) \pmod{N},$$

s(k;r1;r2)=sum of digits in the sequence m(k;r1;r2) (mod N), m(k;r1;r2)=selected sequence of r2−r1+1 digits, each having a value between 0 and 9 inclusive, in the digit positions r1, r1+1, ..., r2−1, r2 in a selected LDA signal value LDA($t_{k'}$;ref;j) with k'<n, where q1, q2, r1 and r2 are positive integers satisfying $1 \leq q1 < q2$ and $1 \leq r1 < r2$.

37. The method of claim 33, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer m≧1, defining said mth cleartext integer representative $I_{CYF,m}$ by the relation
$I_{CYF,m} = K_m(I_{CLR,m}, (P_N)^{P(n-q1;n-q2;r1;r2)} I_{CLR,m})$,
where $P_N$ is a selected permutation on said set R(N), and P(n−q1;n−q2;r1;r2) is an integer defined by $$P(k1;k2;r1;r2) = \prod_{k=k1}^{k2} s(k;r1;r2) \pmod{N},$$

p(k;r1;r2)=product of digits in the sequence m(k;r1;r2) (mod N), excluding 0, 1 and any non-trivial integer divisor of N, m(k;r1;r2)=selected sequence of r2−r1+1 digits, each having a value between 0 and 9 inclusive, in the digit positions r1, r1+1, . . . , r2−1, r2 in a selected LDA signal value $LDA(t_{k'};ref;j)$ with k'<n, where q1, q2, r1 and r2 are positive integers satisfying 1≦q1<q2 and 1≦r1=r2.

38. The method of claim 33 further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer m≧1, defining said mth cleartext integer representative $I_{CYF,m}$ by the relation
$I_{CYF,m} = K_m((P_N)^{S(n-q1;n-q2;r1;r2)} I_{CLR,m}, I_{CLR,m})$
where $P_N$ is a selected permutation on said set R(N), and S(n−q1;n−q2;r1;r2) is an integer defined by $$S(k1;k2;r1;r2) = \sum_{k=k1}^{k2} s(k;r1;r2) \pmod{N},$$

s(k;r1;r2)=sum of digits in the sequence m(k;r1;r2) (mod N), m(k;r1;r2)=selected sequence of r2−r1+1 digits, each having a value between 0 and 9 inclusive, in the digit positions r1, r1+1, . . . , r2−1, r2 in a selected LDA signal value $LDA(t_{k'};ref;j)$ with k'<n, where q1, q2, r1 and r2 are positive integers satisfying 1≦q1<q2 and 1≦r1<r2.

39. The method of claim 33, further comprising the steps of choosing said encryption transformation E as follows:

providing a sequence of N×N matrices $\{K_a(b,c)\}_a$, where b and c denote the row index and the column index, respectively, where each column of entries $K_a(b,c)$ (c fixed) for each matrix $K_a$ is a permutation of said set of integers R(N) and no two columns of a matrix $K_a(b,c)$ are identical; and for at least one integer m>1, defining said mth cleartext integer representative $I_{CYF,m}$ by the relation
$I_{CYF,m} = K_m((P_N)^{P(n-q1;n-q2;r1;r2)} I_{CLR,m}, I_{CLR,m})$
where $P_N$ is a selected permutation on said set R(N), and P(n−q1;n−q2;r1;r2) is an integer defined by $$P(k1;k2;r1;r2) = \prod_{k=k1}^{k2} s(k;r1;r2) \pmod{N},$$

p(k;r1;r2)=product of digits in the sequence m(k;r1;r2) (mod N), excluding 0, 1 and any non-trivial integer divisor of N, m(k;r1;r2)=selected sequence of r2−r1+1 digits, each having a value between 0 and 9 inclusive, in the digit positions r1, r1+1, . . . , r2−1, r2 in a selected LDA signal value $LDA(t_{k'};ref;j)$ with k'<n, where q1, q2, r1 and r2 are positive integers satisfying 1≦q1<q2 and 1≦r1<r2.

* * * * *